United States Patent

Yamada et al.

[11] Patent Number: 6,107,774
[45] Date of Patent: Aug. 22, 2000

[54] APPARATUS AND METHOD FOR CONTROLLING DRIVE OF THREE-PHASE MULTIPLEX WINDING MOTOR

[75] Inventors: Tetsuo Yamada, Gifu; Takayuki Mizuno, Aichi, both of Japan

[73] Assignee: Kabushiki Kaisha Meidensha, Tokyo, Japan

[21] Appl. No.: 09/266,588

[22] Filed: Mar. 11, 1999

[30] Foreign Application Priority Data

Mar. 13, 1998 [JP] Japan .................................. 10-062534

[51] Int. Cl.⁷ ....................................................... H02P 5/28
[52] U.S. Cl. .......................... 318/807; 318/808; 318/800; 318/432; 318/798; 318/799; 318/433; 318/767; 318/778; 318/812; 318/632
[58] Field of Search ..................................... 318/808, 800, 318/432, 798, 799, 433, 767, 778, 812, 632, 807

[56] References Cited

U.S. PATENT DOCUMENTS

| | | | |
|---|---|---|---|
| 5,341,081 | 8/1994 | Yamada | 318/800 |
| 5,481,173 | 1/1996 | Yamamoto | 318/801 |
| 5,594,670 | 1/1997 | Yamamoto | 318/767 |
| 5,701,066 | 12/1997 | Matsuura et al. | 318/808 |

FOREIGN PATENT DOCUMENTS

| | | |
|---|---|---|
| 62-100191 | 5/1987 | Japan . |
| 63-305792 | 12/1988 | Japan . |

OTHER PUBLICATIONS

Yamada, T., et al., "Compensation for Parameters Variation of Induction Motor Improved Torque Control Characteristics at Low and High Speed Region," T–IEE Japan, vol. 112–D, No. 2, pp. 107–116 (1992).

Mizuno, T., et al., "Decoupling Control Method of Induction Motor Taking Stator Core Loss Into Consideration," T–IEE Japan, vol. 109–D, No. 11, pp. 841–848 (1989).

Terashima, M., "Comparison of Practical Performances Between Controlled Current Source and Controlled Voltage Source Vector Control Systems," T–IEE Japan, vol. 107–D, No. 2, pp. 183–190 (1987).

Ashikaga, T., et al., "An Efficiency Maximizing Control Method for Induction Motor Used Electric Vehicle Drive," T–IEE Japan, vol. 116–D, No. 3, pp. 310–318 (1996).

*Primary Examiner*—Karen Masih
*Attorney, Agent, or Firm*—Foley & Lardner

[57] ABSTRACT

In vector control apparatus and method for a three-phase multiplex winding motor, a plurality of inverters are installed, each inverter operatively driving a corresponding one of multiplex windings of the motor and a plurality of inverter controllers are installed whose number corresponds to that of the inverters. Each controller includes: a decoupling voltage calculator for calculating d-axis and q-axis voltage setting values $V_1d^*$ and $V_1q^*$ on the basis of an excitation instruction value $Io^*$, a torque instruction value $I_T^*$, d-axis-and-q-axis current instruction values $i_1d^*$ and $i_1q^*$ which are quotients of the excitation instruction value $Io^*$ and the torque instruction value $I_T^*$ divided respectively by the multiplex number N of the windings of the motor, and a power supply frequency $\omega$ which is an addition of a slip frequency $\omega s$ to a rotor revolution frequency $\omega r$; a d-axis-and-q-axis current controller for performing P-I calculations for respective deviations between d-axis current instruction value $i_1d^*$ and its detected value $i_1d$ and between q-axis current instruction value $i_1q^*$ and its detected value $i_1q$ so as to derive d-axis and q-axis voltage errors $\Delta V_1d$ and $\Delta V_1q$; and a plurality of PWM circuits, each receiving d-axis and q-axis voltages $V_1d$ and $V_1q$ as d-axis and d-axis voltage instructions and generating and outputting gate signals to the corresponding one of the inverters, the d-axis and d-axis voltages being respective additions of the d-axis and q-axis voltage setting values $V_1d^*$ and $V_1q^*$ to the d-axis-and-q-axis voltage errors $\Delta V_1d$ and $\Delta V_1q$.

20 Claims, 17 Drawing Sheets

$$L_\sigma = L_1 - \frac{M^2}{L_2}$$

$$M' = \frac{M^2}{L_2}$$

$$R_2' = \left(\frac{M}{L_2}\right)^2 R_2$$

APPARATUS AND METHOD FOR CONTROLLING DRIVE OF THREE-PHASE MULTIPLEX WINDING MOTOR

BACKGROUND OF THE INVENTION a) Field of the Invention

The present invention relates to apparatus and method for controlling drive of a three-phase multiplex winding motor and, more particularly, relates to vector control apparatus and method for the three-phase N-plex (N=2, 3, 4,- - -) winding motor preferably with a secondary resistance variation compensation method.

b) Description of the Related Art

Japanese Patent Application First Publications No. Showa 62-100191 published on May 9, 1987 and No. Showa 63-305792 published on Dec. 13, 1998 exemplify previously proposed drive systems for multiplex winding AC motors.

Each of these systems drives an N-plex winding motor through N number of inverters to permit a large capacity of the motor (N=2, 3, 4, - - -).

Each of the previously proposed drive systems for the N-plex winding motor through the correspondingly same phase voltage or current so as to drive the N-plex winding motor.

However, an object of providing each of the previously proposed drive systems is merely to achieve a larger capacity of the motor. In addition, a decoupling control cannot be achieved as has been carried out in a conventional three-phase induction motor.

Examples of literatures describing the decoupling controls for the three-phase induction motors are listed below.

Literature 1:

"Comparison of Practical Performances between Controlled Current Source and Controlled Voltage Source Vector Control Systems" described in a Japanese Paper of an institute of Electrical Engineering (J-IEE) D, volume 107 No. 2, published in 1987, and authored by Masayuki Terashima, et al.

Literature 2:

"Compensation for Parameters Variation of Induction Motor Improved Torque Control Characteristics at Low and High Speed Region" described in the Japanese Paper of the institute of Electrical Engineering (J-IEE) D, volume 112 No. 2, published in 1992, and authored by Tetsuo Yamada, et al.

SUMMARY OF THE INVENTION

When the high performance control is carried out in such a three-phase multiplex winding motor as described above, an improvement in a current response by means of the decoupling control as described in the literature 1 and the parameter variation compensation as described in the literature 2 are necessary.

It is therefore an object of the present invention to provide control apparatus and method for controlling a drive of a three-phase multiplex winding motor which can achieve a decoupling control for the three-phase multiplex winding motor, can control a secondary magnetic flux and secondary current in a decoupling control mode, and can achieve an ideal vector control.

According to one aspect of the present invention, there is provided with a control apparatus for a three-phase multiplex winding motor, comprising: a plurality of inverters, each inverter operatively driving a corresponding winding couple of multiplex windings of the motor; a plurality of controllers whose number corresponds to that of the inverters, each controller controlling an operation of a corresponding one of the inverters, each controller including: a decoupling voltage calculator for calculating d-axis and q-axis voltage setting values $V_1d^*$ and $V_1q^*$ on the basis of an excitation instruction value $Io^*$, a torque instruction value $I_T^*$, d-axis-and-q-axis current instruction values $i_1d^*$ and $i_1q^*$ which are quotients of the excitation instruction value $Io^*$ and the torque instruction value $I_T^*$ divided respectively by the multiplex number N of the winding couples of the motor, and a power supply frequency $\omega$ which is an addition of a slip frequency $\omega s$ to a rotor revolution frequency $\omega r$; a d-axis-and-q-axis current controller for performing proportional-and-integration calculations for respective deviations between d-axis current instruction value $i_1d^*$ and its detected value $i_1d$ and between q-axis current instruction value $i_1q^*$ and its detected value $i_1q$ so as to derive d-axis and q-axis voltage errors $\Delta V_1d$ and $\Delta V_1q$; and a plurality of PWM circuits, each PWM circuit receiving d-axis and q-axis voltages $V_1d$ and $V_1q$ as d-axis and d-axis voltage instructions and generating and outputting gate signals to the corresponding one of the inverters according to the d-axis and q-axis voltage instructions so as to control the operation of the corresponding one of the inverters, the d-axis and d-axis voltages being respective additions of the d-axis and q-axis voltage setting values $V_1d^*$ and $V_1q^*$ received from the decoupling voltage calculator to d-axis-and-q-axis voltage errors $\Delta V_1d$ and $\Delta V_1q$ outputted from the d-axis-and-q-axis current controller.

According to another aspect of the present invention, there is provided with a control method for a three-phase multiplex winding motor, comprising: providing a plurality of inverters, each inverter operatively driving a corresponding winding couple of multiplex windings of the motor; calculating d-axis and q-axis voltage setting values $V_1d^*$ and $V_1q^*$ on the basis of an excitation instruction value $Io^*$, a torque instruction value $I_T^*$ d-axis-and-q-axis current instruction values $i_1d^*$ and $i_1q^*$ which are quotients of the excitation instruction value $Io^*$ and the torque instruction value $I_T^*$ divided respectively by a multiplex number N of the winding couples of the motor, and a power supply frequency $\omega$ which is an addition of a slip frequency $\omega s$ to a rotor revolution frequency $\omega r$; calculating a proportional-and-integration for respective deviations between d-axis current instruction value $i_1d^*$ and its detected value $i_1d$ and between q-axis current instruction value $i_1q^*$ and its detected value $i_1q$ so as to derive d-axis and q-axis voltage errors $\Delta V_1d$ and $\Delta V_1q$; receiving d-axis and q-axis voltages $V_1d$ and $V_1q$ as d-axis and d-axis voltage instructions; and outputting gate signals to the corresponding one of the inverters so as to control the operation of the corresponding one of the inverters, the d-axis and d-axis voltages being respective additions of the d-axis and q-axis voltage setting values $V_1d^*$ and $V_1q^*$ to d-axis-and-q-axis voltage errors $\Delta V_1d$ and $\Delta V_1q$.

This summary of the invention does not necessarily describe all necessary features so that the invention may also be a sub-combination of these described features.

BEST MODE FOR CARRYING OUT THE INVENTION

Reference will hereinafter be made to the drawings in order to facilitate a better understanding of the present invention.

Before explaining preferred embodiments of a vector control apparatus for a three-phase N-plex (N=2, 3, 4, - - - N) winding motor according to the present invention, a three-phase duplex winding motor and its vector control method will be described.

(1) Three-phase Duplex Winding Motor

Figure 1:
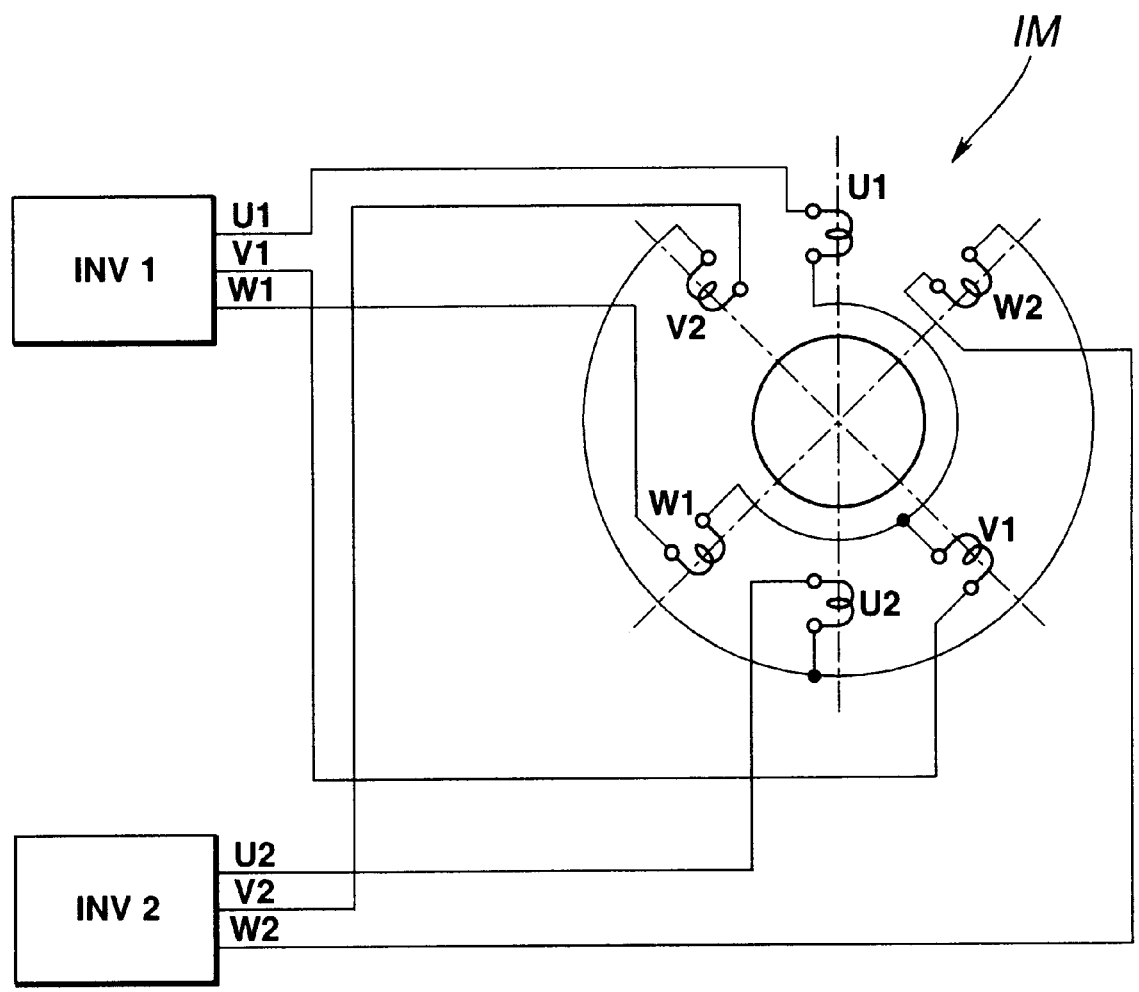
FIG. 1 is a schematic circuit-and-wiring diagram for explaining a drive system of a three-phase duplex winding motor to which the present invention of a vector control apparatus is applicable.

FIG. 1 shows a system configuration of a drive system of the three-phase duplex winding motor.

In this system shown in FIG. 1, two couples of three-phase windings ($u_1$, $v_1$, $w_1$ and $u_2$, $v_2$, $w_2$) formed on a winding of a stator of a six-pole three-phase induction motor IM and the winding of each couple is excited by means of a corresponding power supply constituted by separate inventors (INV1, INV2).

In FIG. 1, the motor to be used and to which the present invention is applicable is constituted by a six-pole induction motor, three windings $u_1$, $v_1$, $w_1$ constituting one winding couple, and the other three windings $u_2$, $v_2$, $w_2$ constituting the other winding couple.

(2) Voltage Equation on Two Axes

Figure 2:
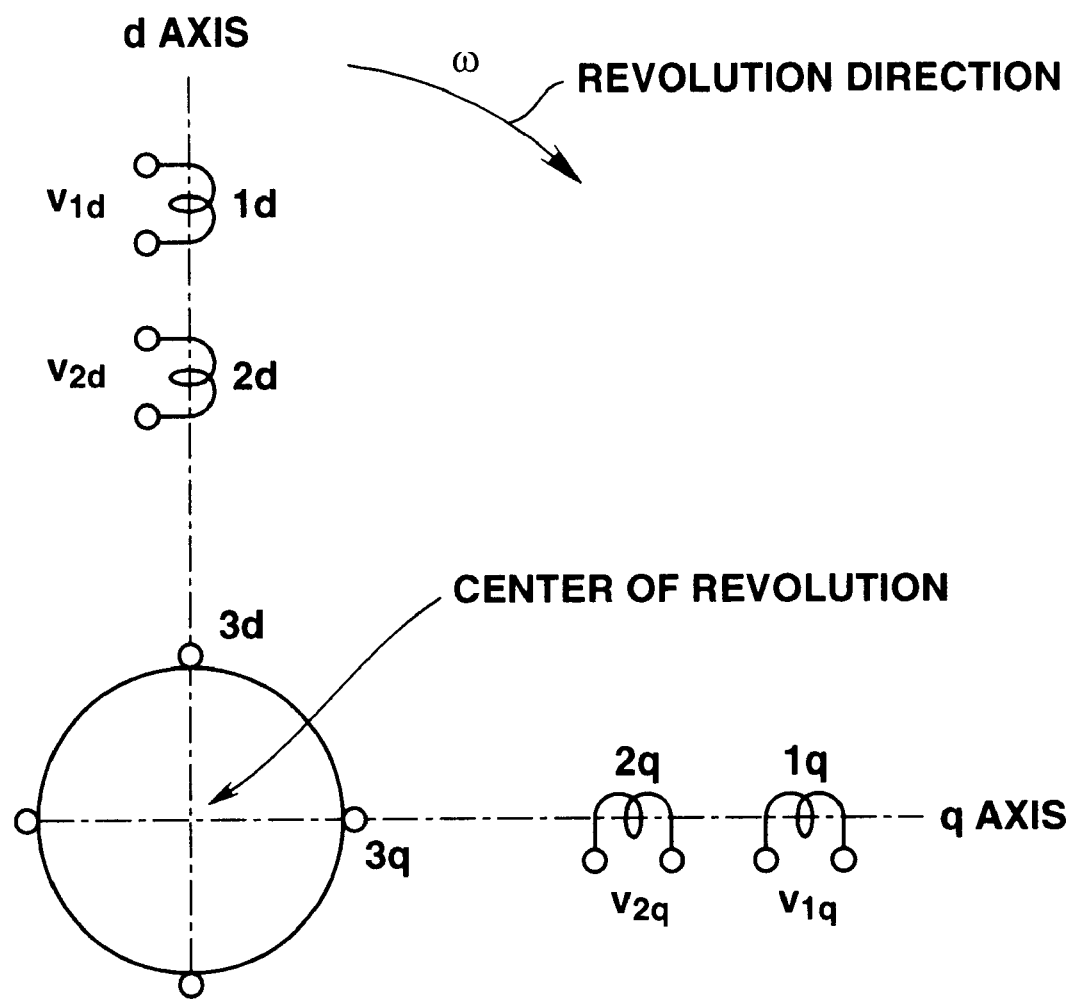
FIG. 2 is an explanatory view of a winding model of the three-phase duplex winding motor shown in FIG. 1 on d-axis and q-axis.

The three-phase duplex winding motor shown in FIG. 1 is assumed as a winding model on two vector axes shown in FIG. 2.

In FIG. 2, $_1d$ denotes ad-axis component of the stator winding of a first winding couple (a first winding, u1, v1, and w1), $_1q$ denotes a q-axis component of the stator winding of the first winding couple (the first winding), $_2d$ denotes the d-axis component of a stator winding of a second winding couple (a second winding, u2, v2, and w2), $_2q$ denotes the q-axis component of the stator winding of the second winding couple (the second winding), $_3d$ denotes the d-axis component of a rotor winding, and $_3q$ denotes the q-axis component of the rotor winding.

An equation (1) shown in TABLE1 represents a voltage equation on a d-q axis rotating at a power supply angular frequency ω in FIG. 1. The equation (1) is described in a Japanese Paper of Institute of Electrical Engineering (J-IEE) D, Volume 109 No. 11, titled Decoupling Control Method For Induction Motor with Stator Iron Loss published in 1989 and authored by Takayuki Mizuno, et al.

It is noted that, in the equation (1), $R_1$ denotes a resistance corresponding to one phase of the first winding, $L_1$ denotes a self inductance corresponding to one phase of the first winding, $L_2$ denotes a resistance corresponding to one phase of the second winding, $L_2$ denotes the self inductance corresponding to one phase of the second winding, $R_3$ denotes a resistance corresponding one phase of a rotor winding, $M_{12}$, $M_{13}$, and $M_{23}$ denote mutual inductances between respective couples of the windings, S denotes a slip, and P=d/dt (differential operator).

If each winding is a balanced winding, $R_1=R_2$, $L_1=L_2$, $M=M_{12} \approx M_{13} \approx M_{23}$.

In addition, a torque T is represented by an equation (2) shown in TABLE1.

In the equation (2), Pole denotes the number of poles in the motor.

(3) Rearrangement in the Voltage Equation

A secondary magnetic flux on the three-phase duplex winding motor shown in FIG. 1 can be represented by an equation (3) of TABLE 1.

According to the equation (3), an equation (4) is established.

A current vector in the equation (1) is given by substituting the equation (4) into the equation (1). The current vector described above is given as shown in an equation (5) of TABLE 2.

If the equation (5) is substituted into the equation (1) to rearrange the equation (5), an impedance matrix Z in the equation (1) will be given as shown at a lower matrix in TABLE 2.

An equation (6) in TABLE 3 is resulted from the equation (1).

Suppose that each winding is a balanced winding, $R_1=R_2$, $L_1=L_2$, and $M=M_{12} \approx M_{13} \approx M_{23}$.

If a leakage inductance $M\sigma = M - M^2/L_3$, $$L_1 - M^2/L_3 = (l_1 + M) - M^2/L_3$$
$$= l_1 + (M - M^2/L_3)$$
$$= l_1 + M\sigma; \text{ and}$$

$$L_2 - M^2/L_3 = (l_2 + M) - M^2/L_3$$
$$= l_2 + (M - M^2/L_3)$$
$$= l_2 + M\sigma,$$

wherein $l_1(=l_1)=L_1-M$.

The equation (6) can be rearranged as described in an equation (7) of TABLE 4.

It is noted that if $\lambda_3 d$ and $\lambda_3 q$ in the current vector in a rightmost matrix in the equation (7) is rearranged in a current representation of $\lambda_3 d/M$ and $\lambda_3 q/M$, the equation (7) will be given as in an equation (8) of TABLE 4.

In the equation (8), $R_3'=(M/L_3)^2 R_3$ and $M'=M^2/L_3$.

(4) Vector Control Condition

Suppose now that if the d-axis is taken on the secondary magnetic flux, the vector control condition is such that $\lambda_3 d$=constant, $\lambda_3 q$=0, and $i_3 d$=0.

A condition on $i_3 q$ which gives $\lambda_3 q$=0 is given in equations of (9) and (10) of TABLE 5 according to the equation (3).

The equation (10) represents a torque current which is a sum of torque currents $i_1 q$ and $i_2 q$ of the corresponding one of the inverters which is connected to the corresponding one of the winding couples.

Next, a condition of a slip frequency ω s to establish $\lambda_3 q$=0 will be given as follows:

That is to say, two equations of (11) shown in TABLE 5 are derived according to a 6-th row of the equation (8) of TABLE 4.

In addition, a relationship between an excitation current and the secondary magnetic flux when a field control is carried out will be given in an equation (12) of TABLE 6.

It is noted that $i_1 d+i_2 d=\lambda_3 d/M$ in the equation (12) under a steady state of the motor.

As described above, in the three-phase duplex winding motor, if the sum of the excitation current and torque current in each inverter (INV1 and INV2) is the excitation current and torque current, it will be appreciated that the same is given to the conventional vector control.

It is noted that the vector control method for the induction motor has been described in U.S. Pat. No. 5,341,081 issued on Aug. 23, 1994 and No. 5,481,173 issued on Jan. 2, 1996 (, the disclosure of each of which are herein incorporated by reference).

On the other hand, a torque T when the vector control is established is derived as in equations (12A) and (12B) of TABLE 6 according to the equation (2).

When the equation (9) is substituted in the equation (12A) of TABLE 6, it will be appreciated that the torque T is the same as in the conventional vector control method. That is to say, an equation (13) of TABLE 6 is established.

(5) Decoupling Control Voltage Calculation

If ideal voltages $V_1 d$ and $V_1 q$ of a d-axis primary voltage and a q-axis primary voltage under the steady state when a vector control condition is established are given, equations (14) of TABLE 7 is established.

In the equations (14), $\lambda_3 d/M=i_1 d+i_2 d$.

If the equations (14) are rearranged, equations (14)' of TABLE 7 are given.

(6) Equivalent Circuit

1) Three-phase Motor

Figure 3:
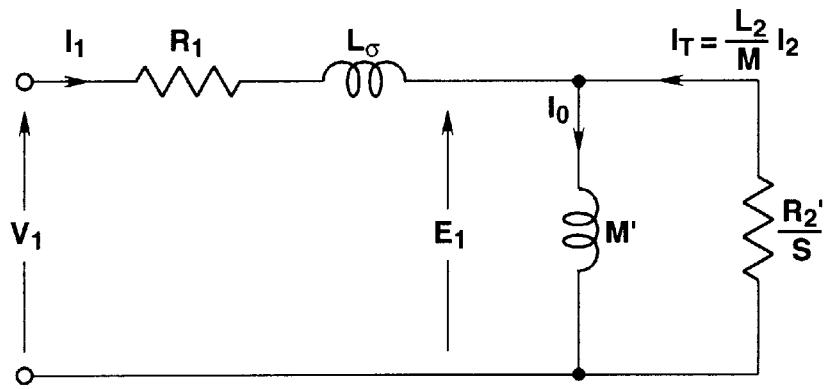
FIG. 3 is a circuit block diagram of an equivalent circuit of a T-I type in a general three-phase motor.

FIG. 3 shows a T-I type equivalent circuit used in a vector control apparatus of the normal three-phase induction motor.

Figure 4:
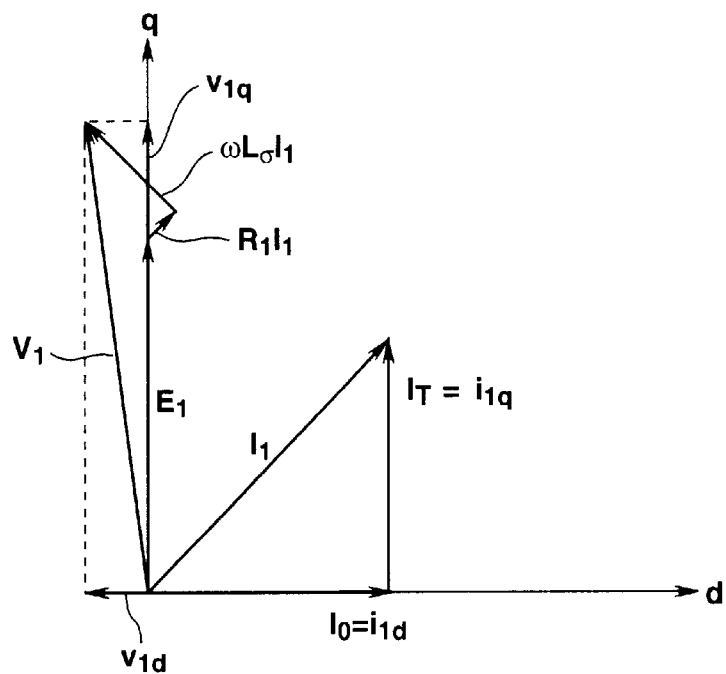
FIG. 4 is a vector diagram in the general three-phase motor shown in FIG. 3.

FIG. 4 shows a vector diagram of the three-phase induction motor.

The ideal voltages of d-axis and q-axis primary voltages under the steady state when the vector control condition is established are given in equations (15) of TABLE 8.

When the equations (14) of TABLE 7 are respectively compared with the equations (15) of TABLE8, a term of M σ is added to the d-axis and q-axis components in the equations (14), respectively. In addition, $L\sigma \rightarrow l_1$.

2) Three-phase Duplex Winding Motor

Figure 5:
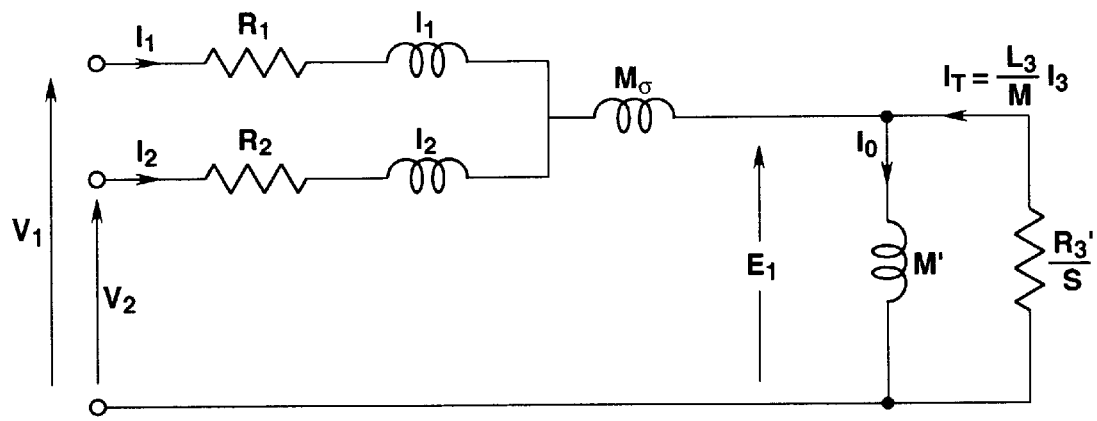
FIG. 5 is a circuit block diagram of an equivalent circuit of the three-phase duplex winding motor shown in FIGS. 1 and 2.
Figure 6:
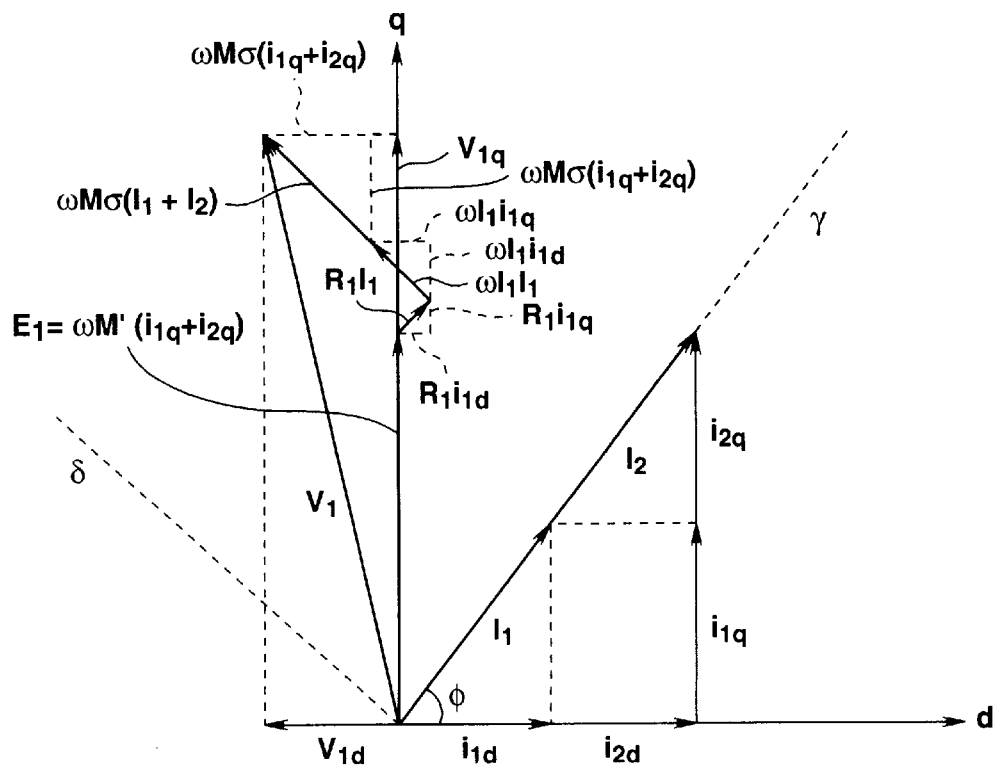
FIG. 6 is a vector diagram in the three-phase duplex winding motor shown in FIGS. 1 and 2.

In three-phase duplex winding motor, the secondary circuit (rotor side) is common. Hence, the equation (14) can be represented in an equivalent circuit in FIG. 5. FIG. 6 shows the vector diagram derived according to the equation (14) and the equivalent circuit of FIG. 5.

If each winding is the balanced winding which can be expressed as $R_1=R_2$, $L_1=L_2$, $M=M_{12} \approx M_{13} \approx M_{23}$ and the currents flowing through each inverter INV1 and INV2 are controlled in such a way as $i_1 d=i_2 d$, $i_1 q=i_2 q$, the vector diagram in the case of the primary voltage $V_2$ of the inverter INV2 is the same as that in the case of the primary voltage $V_1$ of the inverter INV1.

It is herein noted that, in FIG. 6, $E_1$ in $V_1$ is determined as $i_1 d+i_2 d$ (the sum of the excitation currents), a primary impedance voltage drop ($R_1$, $l_1$) is determined by $I_1(i_1 d+i_1 q)$ and a mutual leakage inductance voltage drop $M\sigma$ is determined according to $I_1+I_2(i_1 d, i_1 q, i_2 d, i_2 q)$.

(7) Control Configuration

Figure 8:
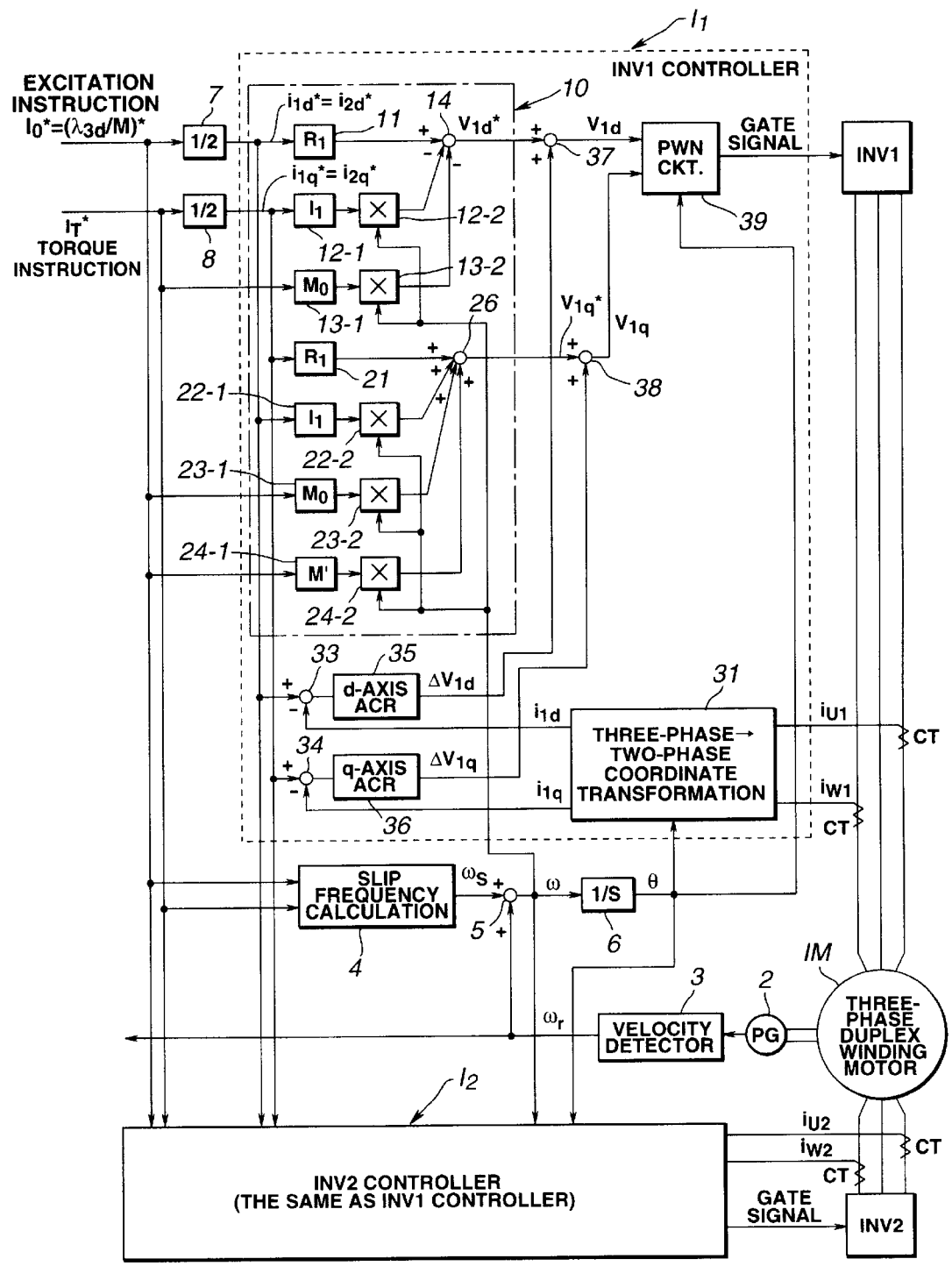
FIG. 8 is a circuit block diagram of the vector control apparatus for the three-phase duplex winding motor in a first preferred embodiment according to the present invention.

FIG. 8 shows the system configuration of a vector control apparatus to drive the three-phase duplex winding motor through the two inverters INV1 and INV2.

Figure 9:
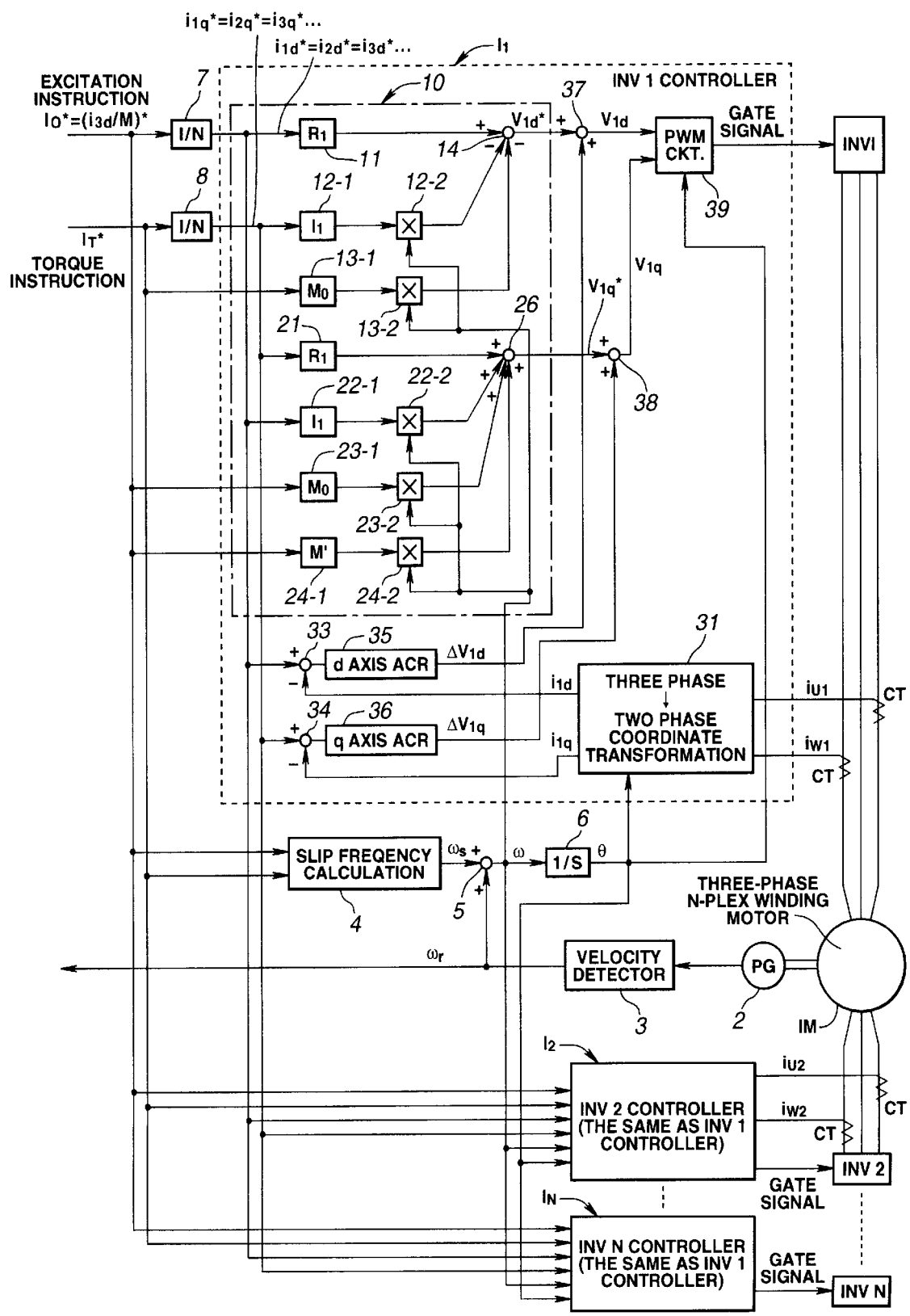
FIG. 9 is a circuit block diagram of the vector control apparatus for the three-phase N-plex winding motor (N=3, 4, - - - N) in a second preferred embodiment according to the present invention.

FIG. 9 shows the system configuration of the vector control apparatus to drive the three-phase multiplex (N-plex, N=3, 4, - - -) winding motor through the same N number of inverters INV1 through INVN.

Different points between vector control systems in the three-phase N-plex winding motor and in a normal three-phase induction motor will be described as follows:

1) An excitation current instruction value Io* and a torque current instruction value for each inverter in the case of the three-phase N-plex winding motor are division values (quotients) of the excitation current instruction Io* and the torque instruction $I_T$* respectively divided by the number of inverters (N) (namely, 1N) in the case of the three-phase multiplex (N-plex) winding motor.

2) In the case of a derivation of an induced voltage E in the decoupling control voltage calculation of each inverter controller $I_1$, $I_2$, - - - $I_N$, a whole excitation instruction $Io*=(\lambda_3 d/M)*=i_1 d*+i_2 d*+ $ - - - is used.

3) A primary impedance voltage drop ($R_1$, $l_1/R_2$, $l_2/R_3$, - - - ) is determined according to the primary current ($i_1 d$, $i_1 q/i_2 d$, $i_2 q/i_2 d$).

4) A mutual leakage inductance voltage drop $M\sigma$ is determined according to a total sum of a primary current of the whole inverters.

Figure 10:
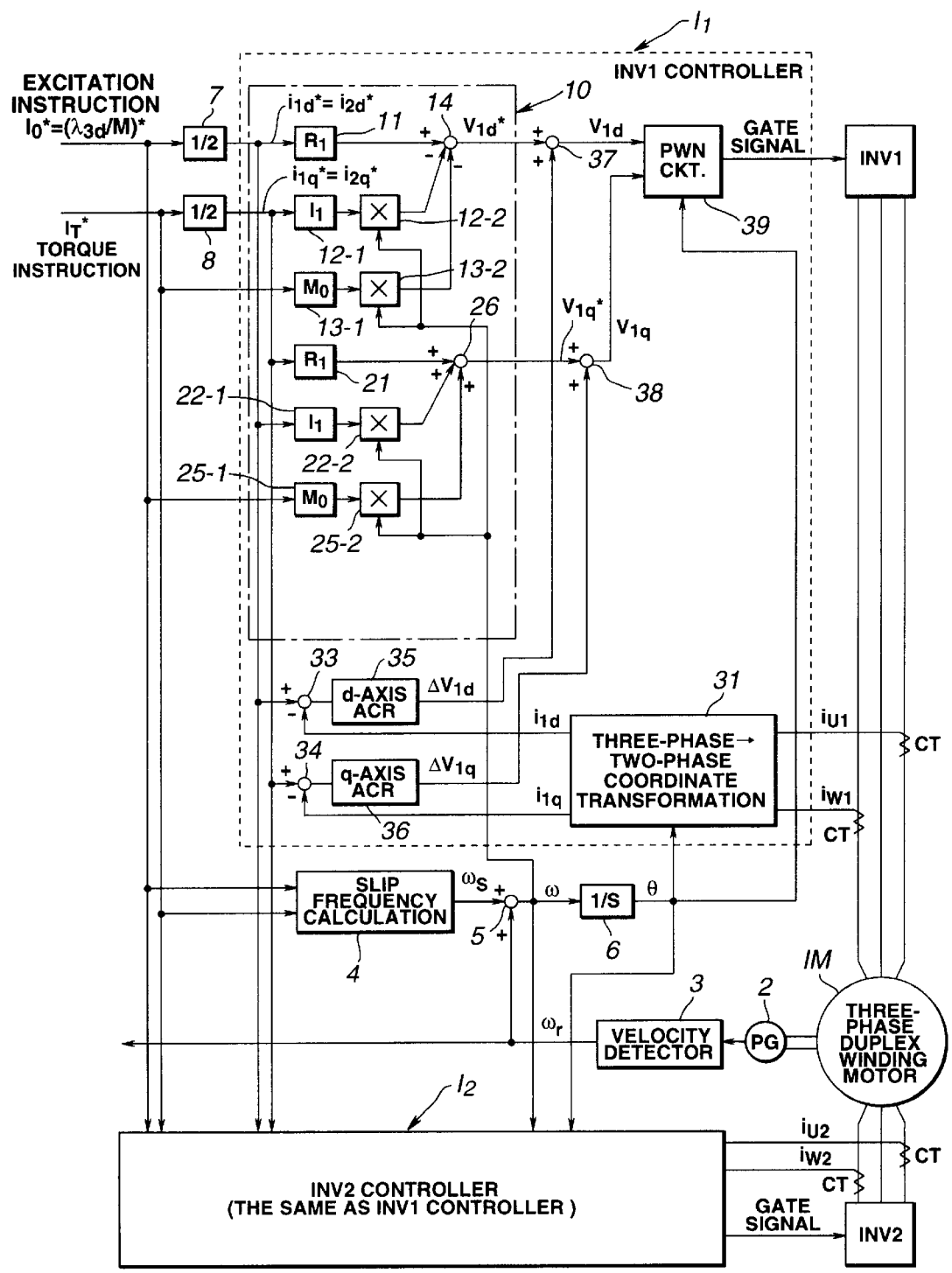
FIG. 10 is a circuit block diagram of the vector control apparatus for the three-phase duplex winding motor in a third preferred embodiment according to the present invention.
Figure 11:
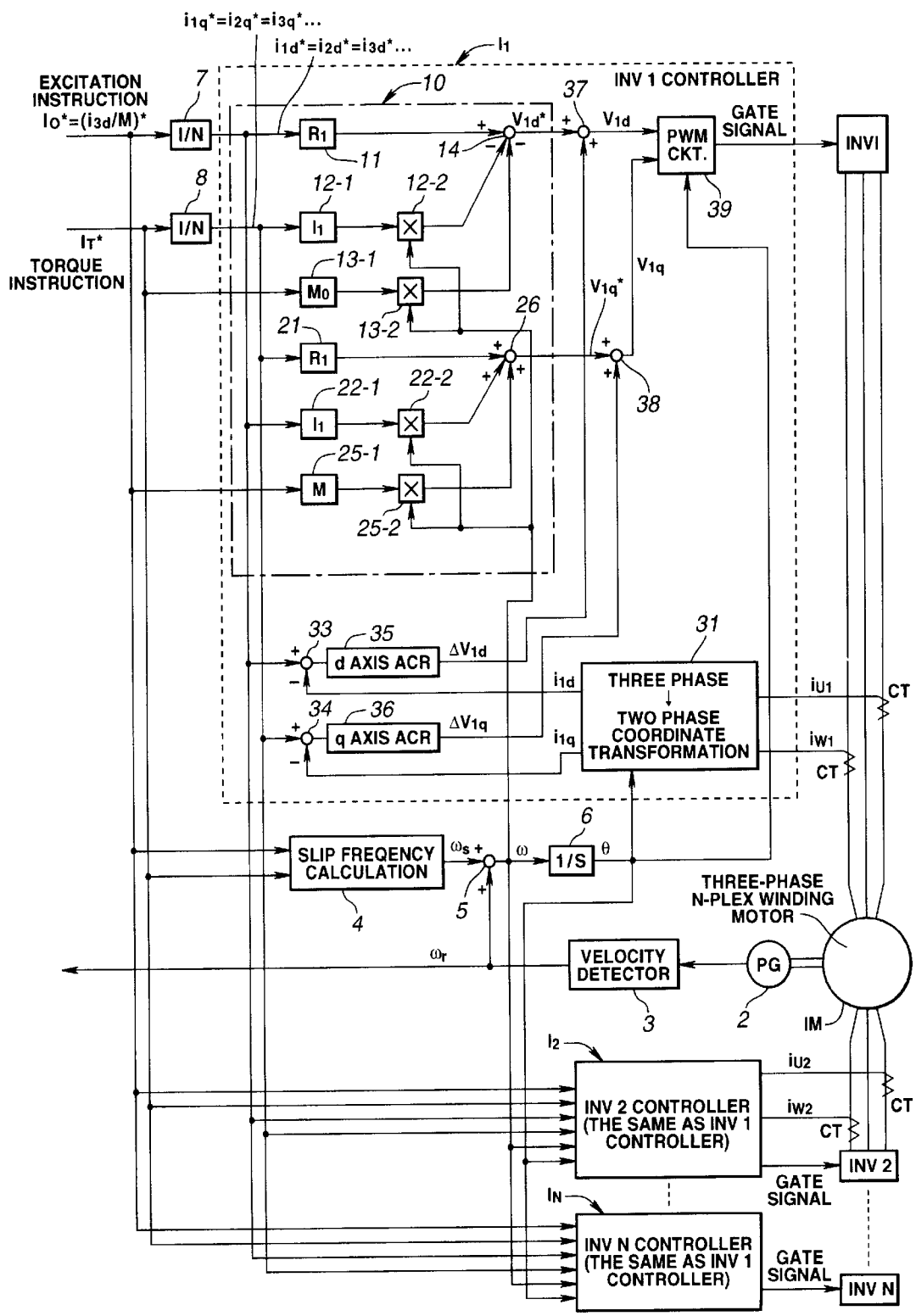
FIG. 11 is a circuit block diagram of the vector control apparatus for the three-phase N-plex winding motor in a fourth preferred embodiment according to the present invention.

In addition, if the equations of (14)' are used, the decoupling control voltage calculator may alternatively be modified as shown in FIG. 10 or FIG. 11.

When a field weakening control is carried out at a constant output region and in an application wherein magnetic fluxes are variable in order to perform a maximum efficiency control, the excitation current instruction Io* in FIGS. 8 through 11 may be derived using the equation (12).

Figure 7:
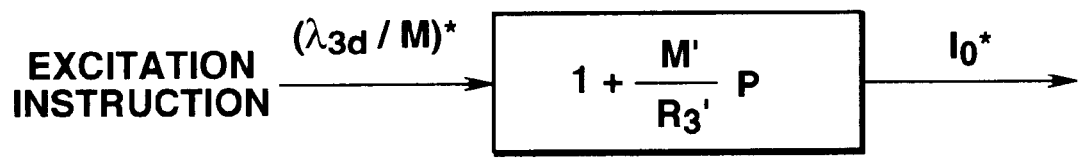
FIG. 7 is an functional block diagram on a first-order phase advance compensation to an excitation instruction to be used in a vector control apparatus for a three-phase duplex winding motor.

FIG. 7 shows the derivation of the excitation current instruction Io* for each inverter controller.

That is to say, the excitation current instruction Io* may be derived by means of a first-order phase advance compensation (filter) from an original excitation instruction ($\lambda_3 d/M$)*.

(8) Secondary Resistance Variation Compensation

As described above, if the secondary resistance $R_3$ is varied due to a temperature variation under the current controlled state in which the primary currents $I_i$ and $I_2$ are controlled at constant values, an impedance ratio between M' and $R_3'/S$ is varied so that the induced voltage E is varied.

If the induced voltage E is varied, the vector control condition becomes unestablished.

The ideal voltages carried out in the decoupling voltage calculation shown in FIGS. 8 through 11 becomes different in values from the actual voltages.

In order to compensate for this voltage variation, the d-axis and q-axis ACR (current controllers) are operated. In details, in order to compensate for a voltage variation due to the secondary resistance variation, the ACR amplifier is operated. Hence, the ACR amplifier outputs (d-axis and q-axis voltage errors) $\Delta V_i d$ and $\Delta V_1 q$ are detected and the slip frequency $\omega s$ is corrected so as to give zero to the ACR amplifier outputs $\Delta V_1 d$ and $\Delta V_1 q$.

Consequently, the secondary resistance variation compensation can be achieved in the case of the three-phase multiplex winding motor.

A method of compensating for the secondary resistance variation will be described below with reference to FIG. 8 and FIGS. 12, 13, and 14.

1) A method of controlling so as to provide $\Delta V_1 d=0$

Figure 12:
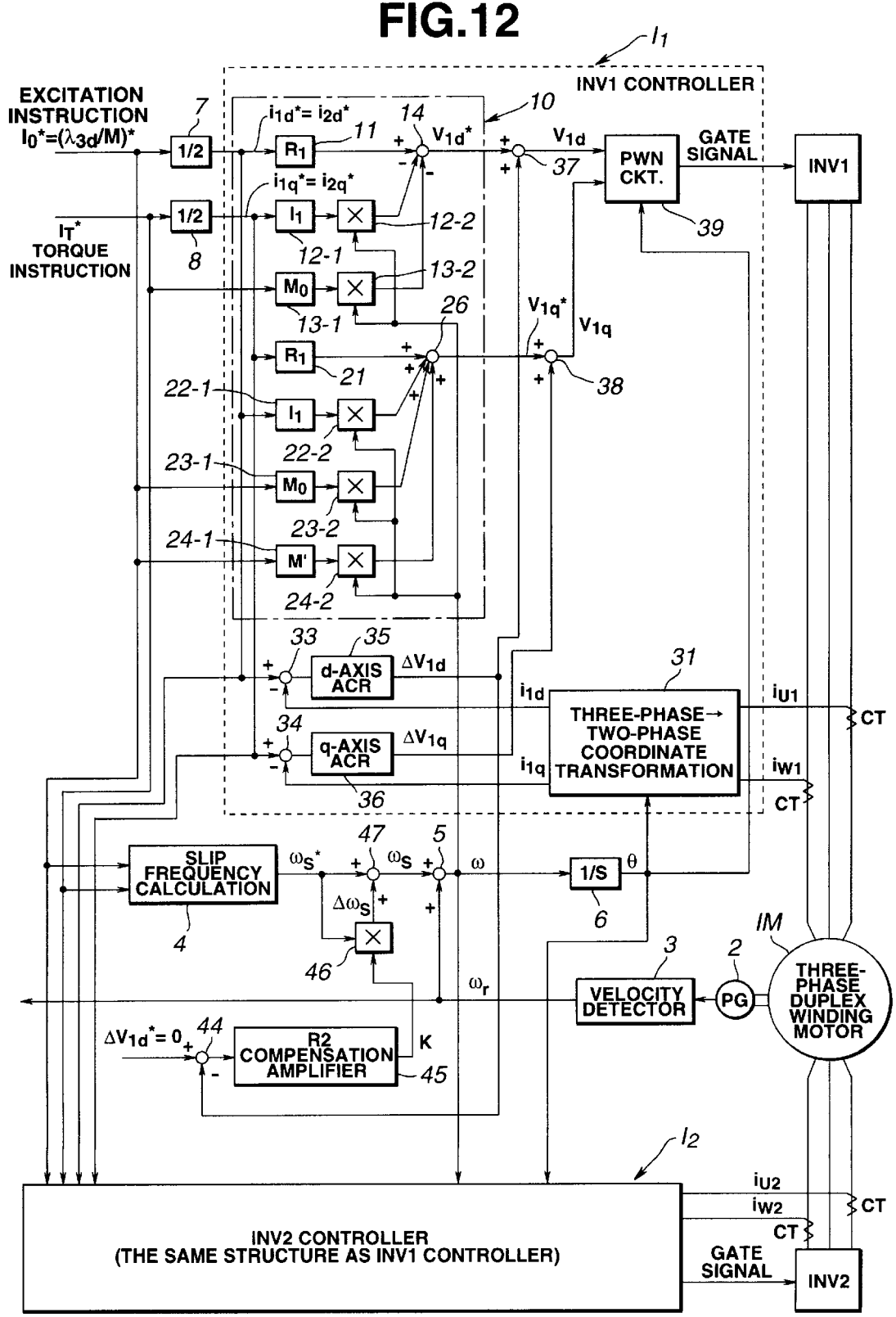
FIG. 12 is a circuit block diagram of the vector control apparatus for the three-phase duplex winding motor in a fifth preferred embodiment according to the present invention in which a secondary resistance variation compensation method is adopted.

As shown in FIG. 12, the d-axis voltage error $\Delta V_1 d$ which is generated due to the variation in the secondary resistance is detected by means of the d-axis ACR 35. If the slip frequency $\omega s$ is controlled so that $\Delta V_1 d=0$, the secondary resistance variation compensation can be carried out.

That is to say, an equation of (16) in TABLE 8 represents the secondary resistance variation compensation method described above.

In the equation (16), * denotes a setting value and K=$R_3$(actual value)/$R_3$ (setting value)=variation rate of the secondary resistance.

2) Method of controlling the slip frequency so as to provide $\Delta V_1 q=0$

Figure 13:
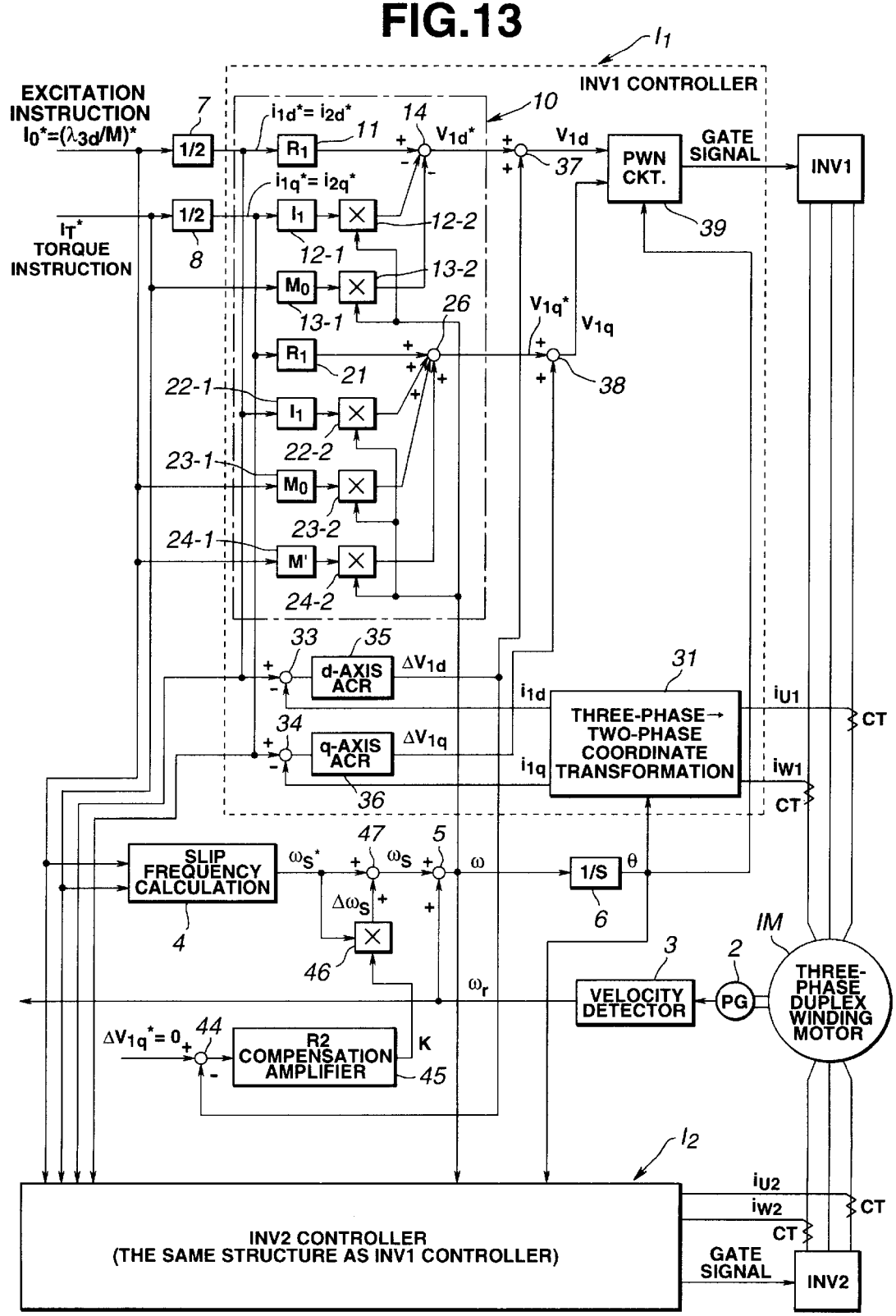
FIG. 13 is a circuit block diagram of the vector control apparatus for the three-phase duplex winding motor in a sixth preferred embodiment according to the present invention in which the secondary resistance variation compensation method is adopted.

As shown in FIG. 13, the secondary resistance variation is compensated by controlling the slip frequency $\omega s$ to give $\Delta V_1 q=0$ with $\Delta V_1 q$ generated due to the variation in the secondary resistance detected by means of the q-axis ACR 36.

3) Method of controlling the slip frequency so as to provide $|\Delta V_1|=0$

Figure 14:
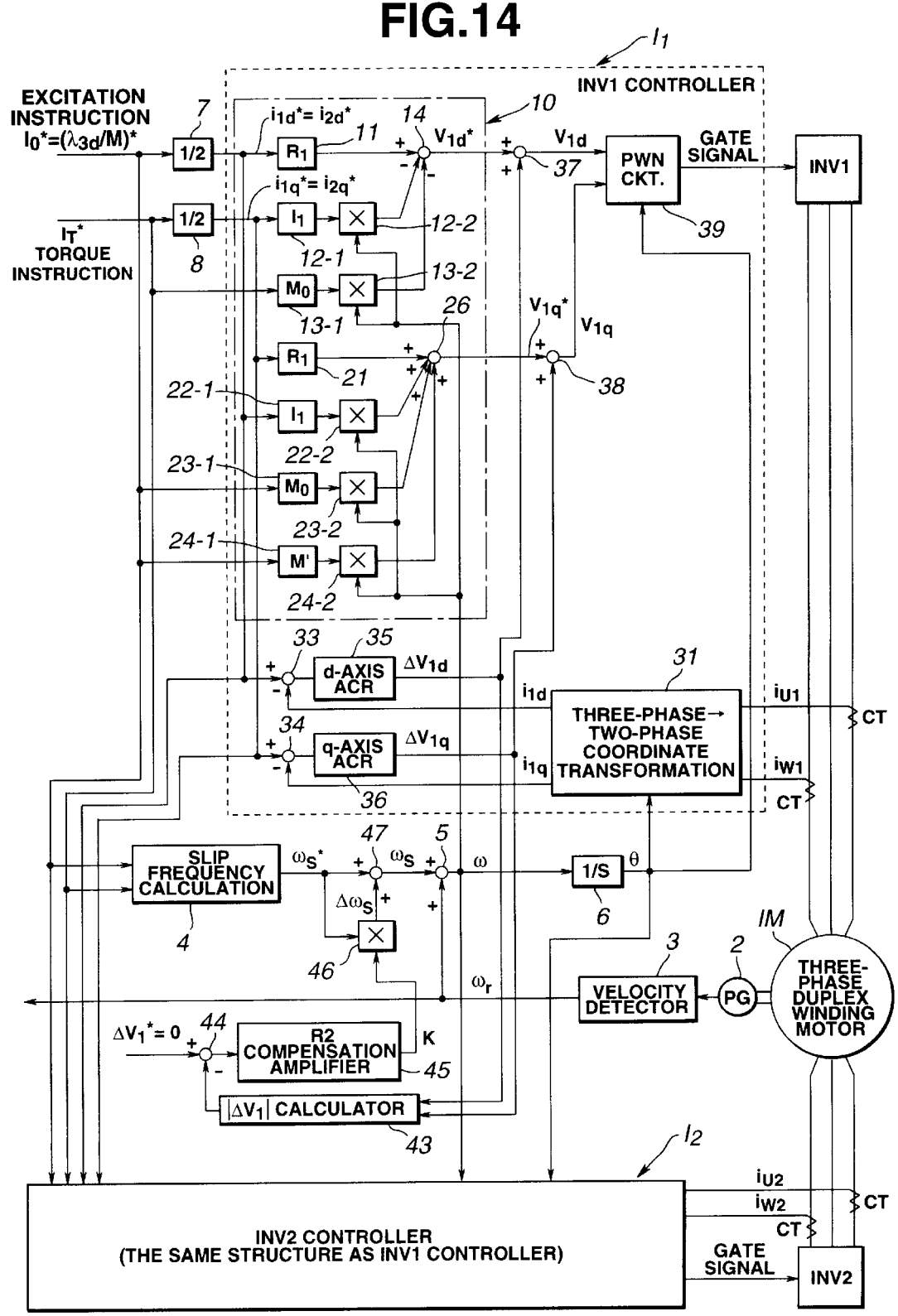
FIG. 14 is a circuit block diagram of the vector control apparatus for the three-phase duplex winding motor in a seventh preferred embodiment according to the present invention in which the secondary resistance variation compensation method is adopted.

As shown in FIG. 14, a square root of a sum of $(\Delta V_1 d)^2$ and $(\Delta V_1 q)^2$ is derived so that the slip frequency $\omega s$ is controlled so as to provide $|\Delta V_1|=0$ to compensate for the variation in the secondary resistance.

An equation (17) of TABLE 8 represents the above-described method.

4) Robust secondary resistance variation compensation method against the primary resistance variation.

The slip frequency $\omega s$ is controlled on the basis of the contents of the Literature 2 titled "Compensation for Parameters Variation of Induction Motor Improved Torque Control Characteristics at Low and High Speed Region" described in the BACKGROUND OF THE INVZENTION so that an δ-axis voltage variation (error) $\Delta V_1 q$ on a primary current coordinate axes (γ-δ axis) gives zero. Consequently, the secondary resistance variation is compensated for which is not susceptible to the variation in a primary resistance.

As shown in FIG. 6, a phase angle φ between the d-q axis and γ-δ axis is derived according to FIG. 6 using an equation (18) of TABLE 8.

In addition, $\Delta V_1 \gamma$ and $\Delta V_1 \delta$ are derived using equations (19) and (19)' of TABLE 9.

According to the equation (19)', $\Delta V_1 \delta$ is derived and the slip frequency $\omega s$ is controlled so that $V_1 \delta=0$.

Consequently, the robust secondary resistance variation compensation which is not susceptible to the primary resistance variation can be carried out.

Figure 15:
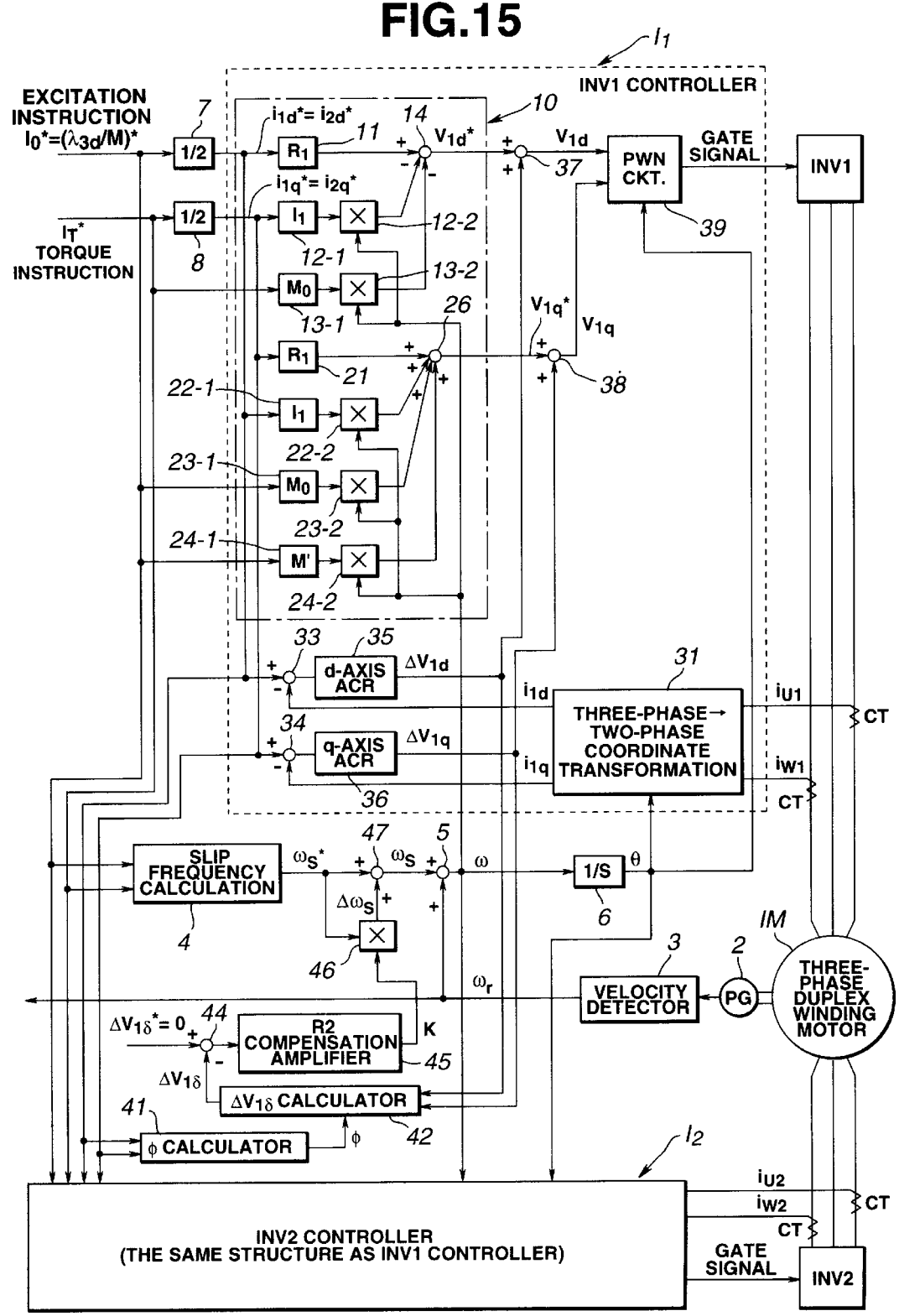
FIG. 15 is a circuit block diagram of the vector control apparatus for the three-phase duplex winding motor in a seventh preferred embodiment according to the present invention in which the secondary resistance variation compensation method is adopted.

FIG. 15 shows the system configuration for the vector control apparatus for the three-phase multiplex winding motor in which the above-described robust compensation method is adopted.

Although, in each vector control apparatus for the three-phase duplex winding motor shown in FIGS. 12 through 15, the ACR outputs in one of the inverters INV1, namely, $\Delta V_1 d$, $\Delta V_1 q$ and $i_1 d$, $i_1 q$ are used, the same advantages can be achieved even when the ACR outputs in the other inverter INV2, namely, $\Delta V_2 d$, $\Delta V_2 q$, $i_2 d$, and $i_2 q$ are used.

It is noted that each method for compensating the secondary resistance variation applicable to the vector control apparatus for the three-phase N-plex winding motor has been described in FIGS. 16 through 20.

These methods are based on the respective methods for compensating the variation in the secondary resistance for the three-phase duplex winding motor. In FIGS. 10 and 11, the same methods for compensating the variation in the secondary resistance described in the items 1) through 4) can be achieved. FIGS. 10 and 11 show modifications of the decoupling control calculations shown in FIGS. 8 and 9, respectively.

Next, the preferred embodiments of the vector control apparatus for the three-phase multiplex (N-plex, N=2, 3, 4, - - - N) winding motor will be described below.

FIG. 8 shows a first preferred embodiment of the vector control apparatus for the three-phase duplex winding motor. It is noted that N in this embodiment is 2.

In FIG. 8, $I_1$ denotes an inverter controller for controlling operations of switching devices (normally, three pairs and, for example, IGBT (Insulated Gate Bi-polar Transistors) installed in a main circuit of the one inverter INV1 and $I_2$ denotes another inverter controller having the same structure as the inverter controller $I_1$ for controlling the operations of the switching devices installed in the main circuit of the other inverter INV2.

In FIG. 8, a pulse generator (PG) 2 is directly coupled to the motor (three-phase duplex winding motor) IM, a velocity detector 3 receives a pulse train signal from the pulse generator 2 to output a rotor frequency ωr, a slip frequency calculator 4 calculates a slip frequency ωs from the excitation current instruction Io* and the torque current instruction $I_T^*$, an adder 5 adds the frequencies of the rotor ωr and the slip ωs to output a power supply angular frequency ω, an integrator 6 serves to derive an angular frequency θ from the power supply frequency ω, a calculator 7 divides the whole excitation current instruction Io* by the number of the inverters, namely, 2 so that each current instruction ($i_1 d^*$ and $1_2 d^*$) to the inverter INV1 or INV2 is provided ($i_1 d^* = i_2 d^*$).

Decoupling voltage calculators 10 are constituted by a plurality of calculators (11 through 14 and 21 through 26) calculating $V_1 d$ and $V_1 q$ in the equation (14).

The $V_1 d$ calculators (11 through 14) are constituted by a calculator 11 which multiplies $i_1 d^*$ by $R_1$; calculators (12-1 and 12-2) which multiply $i_1 q^*$ by $1_1$ ($=L_1-M$) by which the power supply frequency ω is multiplied; and an adder 14 for adding outputs of the calculators (11, 12-2, and 13-2) with a polarity shown in FIG. 8.

The $V_1 d$ calculators (11 through 14) output d-axis setting voltage $V_1 d^*$ to an adder 37.

The $V_1 q$ calculators (21 through 26) are constituted by a multiplier 21 which multiplies $i_1 q^*$ by $R_1$; multipliers 21-1, 22-2 which multiply Io* by M' ($=M^2/L_3$) by which the power supply frequency ω is multiplied; and an adder 26 by which outputs of the multipliers 21, 22-2, 23-2, and 24-2 are added together.

The $V_1 q$ calculators output the q-axis voltage setting value $V_1 q^*$ to an adder 38.

In FIG. 8, a three-phase-to-two-phase coordinate transformation block 31 serves to convert primary currents $iu_1$ and $iw_1$ of the motor IM detected by means of a CT (current transformer) into d-axis and q-axis detected currents $i_1 d$ and $i_1 q$, the d-axis current controller (33 and 35) for performing the PI calculation for a deviation between $i_1 d^*$ and $i_1 d$ to output the d-axis voltage error $\Delta V_1 d$, and the q-axis current controller (34 and 36) for performing the PI calculation between $i_1 q^*$ and $i_1 q$ to output the q-axis voltage error $\Delta V_1 q$.

The adder 37 adds the d-axis setting voltage $V_1 d^*$ to the d-axis voltage error $\Delta V_1 d$ to issue the d-axis voltage instruction $V_1 d$. The adder 38 adds the q-axis setting voltage $V_1 q^*$ to the q-axis voltage error $\Delta V_1 q$ to issue the q-axis voltage instruction $V_1 q$. The adder 39 is a PWM (Pulse Width Modulation) circuit which controls operations of three switching device pairs of the inverter INV1 on the basis of d-axis and q-axis voltage instructions $V_1 d$ and $V_1 q$. The other inverter controller 2 has the same structure as the one inverter controller $I_1$.

Since, in the first embodiment, the decoupling voltage calculator 10 calculates the ideal voltages of the primary voltage on the d-axis and q-axis in the equation (14), the secondary magnetic flux and secondary current in the three-phase duplex winding motor can be controlled in the decoupling control mode, thus the ideal vector control for the three-phase duplex winding motor being achieved.

FIG. 9 shows the system configuration on the vector control apparatus for a three-phase N-plex winding motor in a second preferred embodiment according to the present invention.

In the second embodiment, the N-plex (N=3, 4, - - - ) winding motor is driven by means of the N number of inverters INV1 through INVN and is controlled by means of the N number of inverter controllers $I_1$ through $I_N$.

Current instructions $I_1 d^*$, $I_2 d^*$, - - - , $I_N d^*$ and $I_1 q^*$, $I_2 q^*$, - - - $I_N q^*$ are 1/N the excitation current instruction value Io* and torque current instruction $I_T^*$.

Hence, dividers 7 and 8 perform the division of these instructions by 1/N, respectively. It is noted that the instructions inputted into each controller $1_1$ through $1_N$ perform division of the instructions by 1/N. The structure of each controller $1_1$ to $1_N$ is the same as $I_1$ the inverter controller INV1 shown in FIG. 8.

FIG. 10 shows a system configuration of the vector control apparatus for the three-phase duplex winding motor in a third preferred embodiment according to the present invention.

In the third embodiment, the $V_1 q$ calculators (21 through 26) in the decoupling voltage calculator 10 are constituted by: a multiplier 21 which multiplies the q-axis current instruction value by $R_1$; multipliers 22-1 and 22-2 which multiply $i_1 d^*$ by $1_1$ by which the power supply frequency ω is multiplied; multipliers 25-1 and 25-2 which multiply Io* ($=i_1 d + i_2 d$) by M by which the power supply frequency ω is multiplied; and an adder 19 which adds the outputs of the multipliers 25-1 and 25-2. The other structure is the same as shown in FIG. 8.

Since, in the third embodiment, the decoupling voltage calculator 10 calculates the equation (14)' by which the equation (14) is rearranged, the ideal vector control becomes possible in the same way as the first embodiment.

FIG. 11 shows the system configuration of the vector control apparatus in the three-phase N-plex winding motor in a fourth embodiment according to the present invention.

In the fourth embodiment, the $V_1 q^*$ calculators (21 through 26) in the decoupling voltage calculator 10 of the vector control apparatus shown in FIG. 9 are so structured as the calculators (21 through 26) in the apparatus shown in FIG. 10.

It is noted that when the field weakening control at the constant output region is carried out in the first through fourth embodiments (FIGS. 8 through 11) and in an application wherein the magnetic flux is varied in order to perform the maximum efficiency control, the block shown in FIG. 7 on the basis of the equation (12) is disposed so that Io* is set at the first-order advance compensation from the original excitation current instruction ($\lambda_3 d/M$)*.

FIG. 12 shows the system configuration with the secondary resistance variation compensation for the three-phase duplex winding motor in a fifth preferred embodiment.

In the fifth embodiment, the secondary variation compensation circuits (44 through 47) are carried out in the vector control apparatus shown in FIG. 8.

The secondary resistance variation compensation circuits (44 through 47) include: a substractor 44 which detects a deviation between a d-axis voltage variation setting value $\Delta V_1 d^*$ ($\Delta V_1 d^* = 0$) and the variation voltage $\Delta V_1 d$ from the d-axis current controller 35; an $R_2$ compensation amplifier 45 which performs the PI calculation for the deviation from the subtractor 44; a multiplier 46 which multiplies the slip frequency ωs* from the slip frequency calculator 4 and the output K of the $R_2$ compensation amplifier 45; and an adder 47 which adds the output of the multiplier 26 to ωs* to be outputted to the adder 5.

The slip frequency ωs outputted from the adder 47 and subjected to the secondary resistance variation compensation is added to the rotor frequency ωr from the velocity detector 3 by means of the adder 5 to provide the secondary resistance variation compensated power supply frequency ω. The secondary resistance variation compensated power supply frequency ω is used in the decoupling voltage calculator 10. This control is called a control under the secondary resistance variation compensation.

The secondary resistance variation compensation circuit 44 to 47 is provided on the basis of the equation (16), namely, controls the slip frequency ωs to provide $\Delta V_1 d$ (=0) so as to provide the secondary resistance variation compensation for the slip frequency ωs.

FIG. 13 shows the system configuration of the secondary resistance variation compensated vector control apparatus for the three-phase duplex winding motor in a sixth preferred embodiment according to the present invention.

In the sixth embodiment shown in FIG. 13 is an addition of the secondary resistance variation compensation circuit (44 to 47) in FIG. 12 to the vector control apparatus for the three-phase duplex winding motor shown in FIG. 8.

It is noted that the secondary resistance variation compensation circuit (44 through 47) includes: the subtractor 44 for detecting a deviation between the q-axis voltage variation setting value $\Delta V_1 q^*$ (=0) and the voltage error $\Delta V_1 q$ from the q-axis current controller 36; the secondary resistance $R_2$ compensation amplifier 45 which carries out the PI calculation on this deviation; the multiplier 46 which multiplies the slip frequency ωs* from the slip frequency calculator 4 by the output K of the secondary resistance variation compensation amplifier 45; and the adder 47 which adds the slip frequency ωs from the slip frequency calculator 4 to the output of the multiplier 46.

The secondary resistance variation compensation circuit performs the secondary resistance variation compensation by controlling the slip frequency so as to provide $\Delta V_1 q=0$.

FIG. 14 shows the system configuration of the vector control apparatus with the secondary resistance variation compensation for the three-phase duplex winding motor in a seventh preferred embodiment according to the present invention.

In the seventh embodiment shown in FIG. 14, the secondary resistance variation compensation circuit (41 through 47) is added to the vector control apparatus shown in FIG. 8.

The secondary resistance variation compensation circuit (43 through 47) includes: a φ (phase) calculator 41 which calculates the phase angle φ recited in the equation (18) from the excitation current (d-axis) instruction $i_1 d^*$ and the torque current (q-axis) instruction $i_1 q^*$; a δ-axis voltage variation ($\Delta V_1 \delta$) calculator 42 which calculates a voltage variation (error) $\Delta V_1 \delta$ recited in the equation (18) from the phase angle φ and the voltage errors $\Delta V_1 d$ and $\Delta V_1 q$ from the d-axis and q-axis current (ACR) controllers 35 and 36; the $R_2$ compensation amplifier (the secondary resistance variation compensation amplifier) 45 which performs the PI calculation for the deviation between such a δ-axis voltage variation setting value as $\Delta V_1 \delta^*$ (=0) and the error value of $\Delta V_1 \delta$; the multiplier 46 which multiplies the slip frequency ωs* from the slip frequency calculator 4 by the output K of the $R_2$ compensation amplifier 45; and the adder 47 which adds the output of the multiplier 46 to the slip frequency ωs* from the slip frequency calculator 4.

The secondary resistance variation compensation circuit (41 through 47) in the eighth embodiment controls the slip frequency to make $\Delta V_1 \delta$ zero ($\Delta V_1 \delta=0$) so as to perform the secondary resistance variation compensation.

Figure 16:
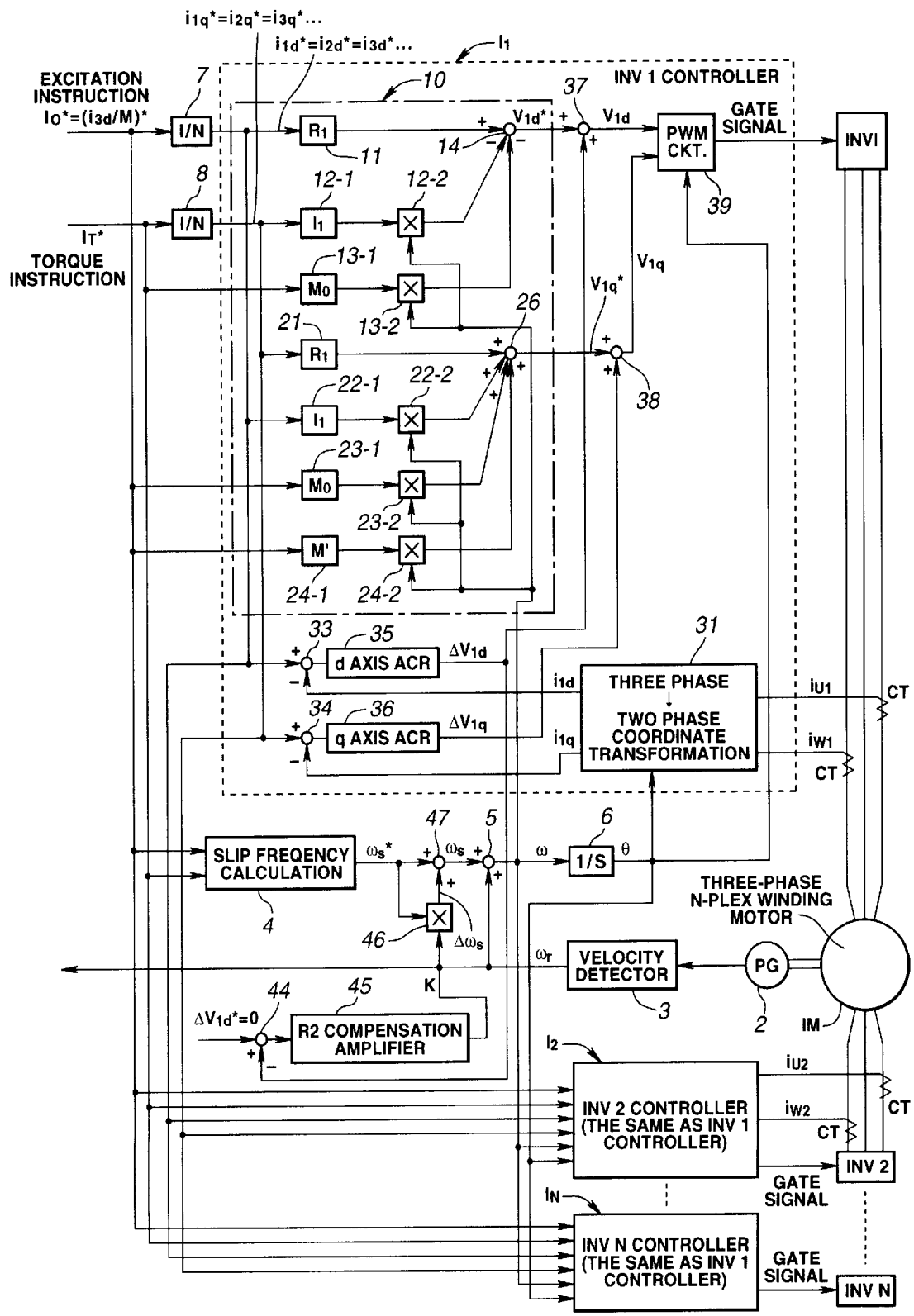
FIG. 16 is a circuit block diagram of the vector control apparatus for the three-phase N-plex winding motor in a ninth preferred embodiment according to the present invention in which the secondary resistance variation compensation method is adopted.

FIG. 16 shows the system configuration of the vector control apparatus with the secondary resistance variation compensation for the three-phase N-plex winding motor in a ninth preferred embodiment according to the present invention.

In the ninth embodiment shown in FIG. 16, the secondary resistance variation compensation circuit (44 to 47) which controls the slip frequency ωs to provide $\Delta V_1 d$ with zero shown in FIG. 12.

Figure 17:
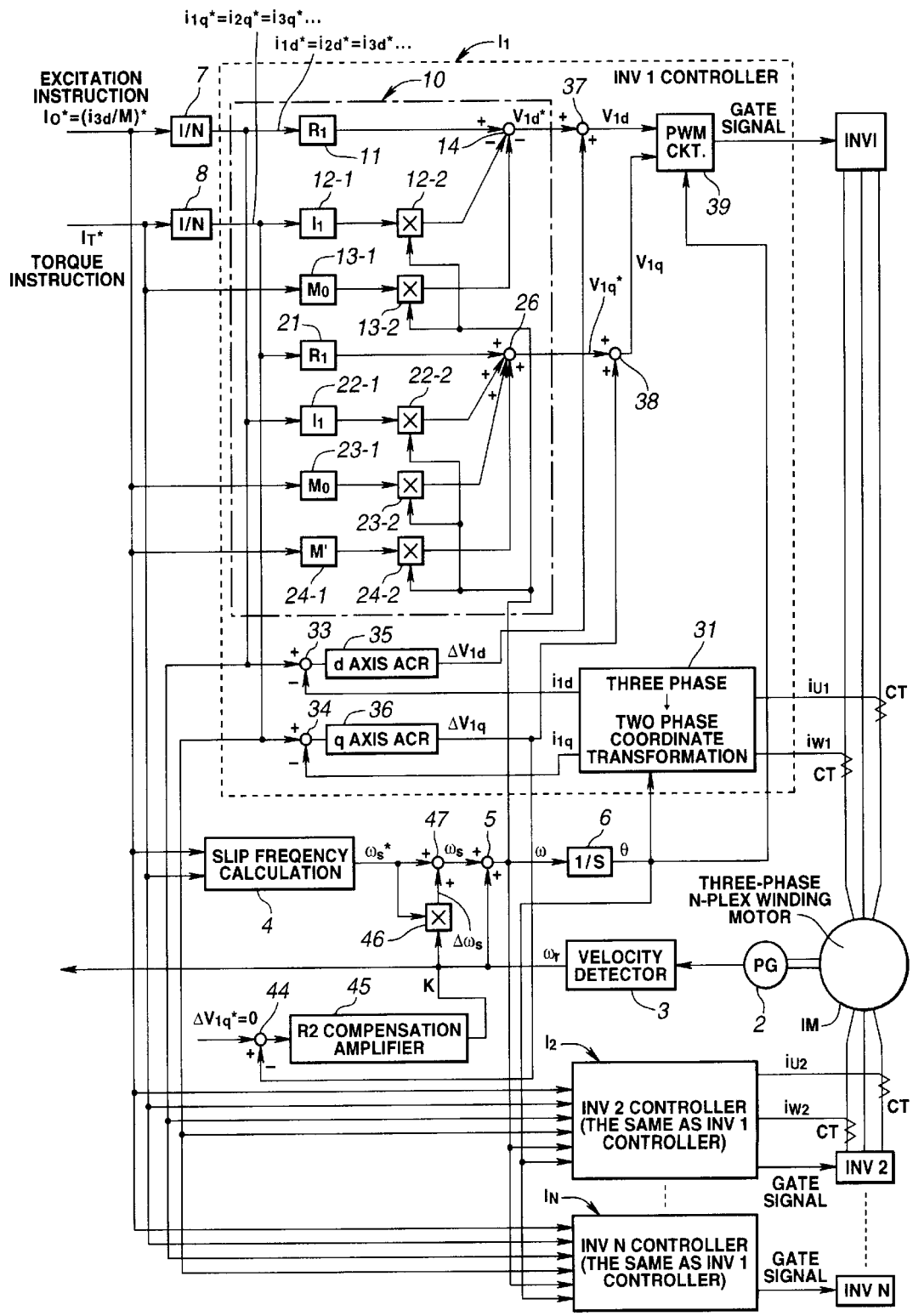
FIG. 17 is a circuit block diagram of the vector control apparatus for the three-phase N-plex winding motor in a tenth preferred embodiment according to the present invention in which the secondary resistance variation compensation method is adopted.

FIG. 17 shows the system configuration of the vector control apparatus with the secondary resistance variation compensation for the three-phase N-plex winding motor in a tenth preferred embodiment according to the present invention.

In the tenth preferred embodiment shown in FIG. 17, the secondary resistance variation compensation circuit (44 to 47) which controls the slip frequency ωs so that $\Delta V_1 q$ shown in FIG. 13 gives zero.

Figure 18:
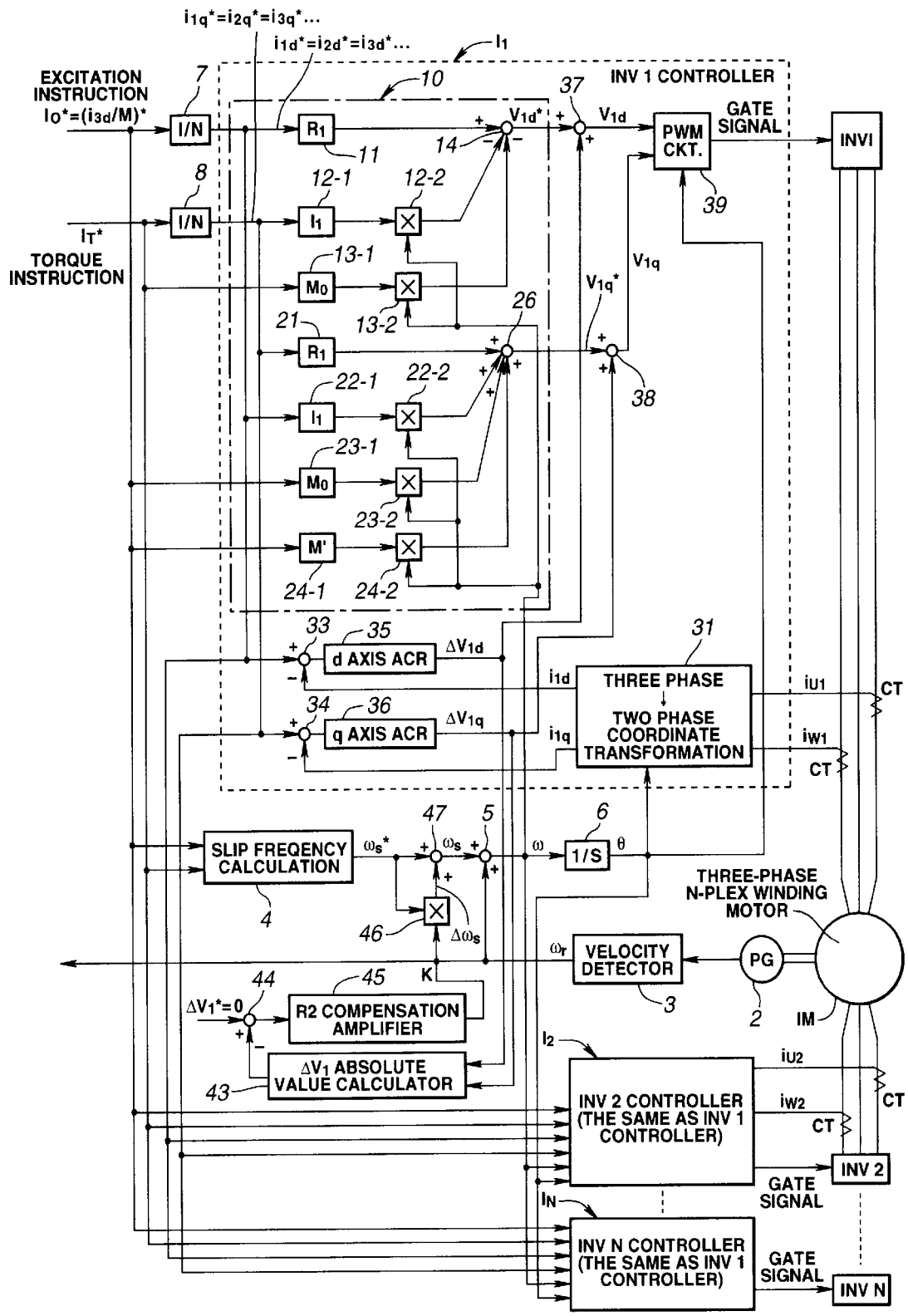
FIG. 18 is a circuit block diagram of the vector control apparatus for the three-phase N-plex winding motor in an eleventh preferred embodiment according to the present invention in which the secondary resistance variation compensation method is adopted.

FIG. 18 shows the vector control apparatus with the secondary resistance variation compensation circuit for the three-phase N-plex winding motor in an eleventh preferred embodiment according to the present invention.

In the eleventh preferred embodiment shown in FIG. 18, the secondary variation resistance compensation circuit (43 to 47) which controls the slip frequency ωs so as to provide $\Delta V_1$ shown in FIG. 14 to be zeroed ($\Delta V_1=0$).

Figure 19:
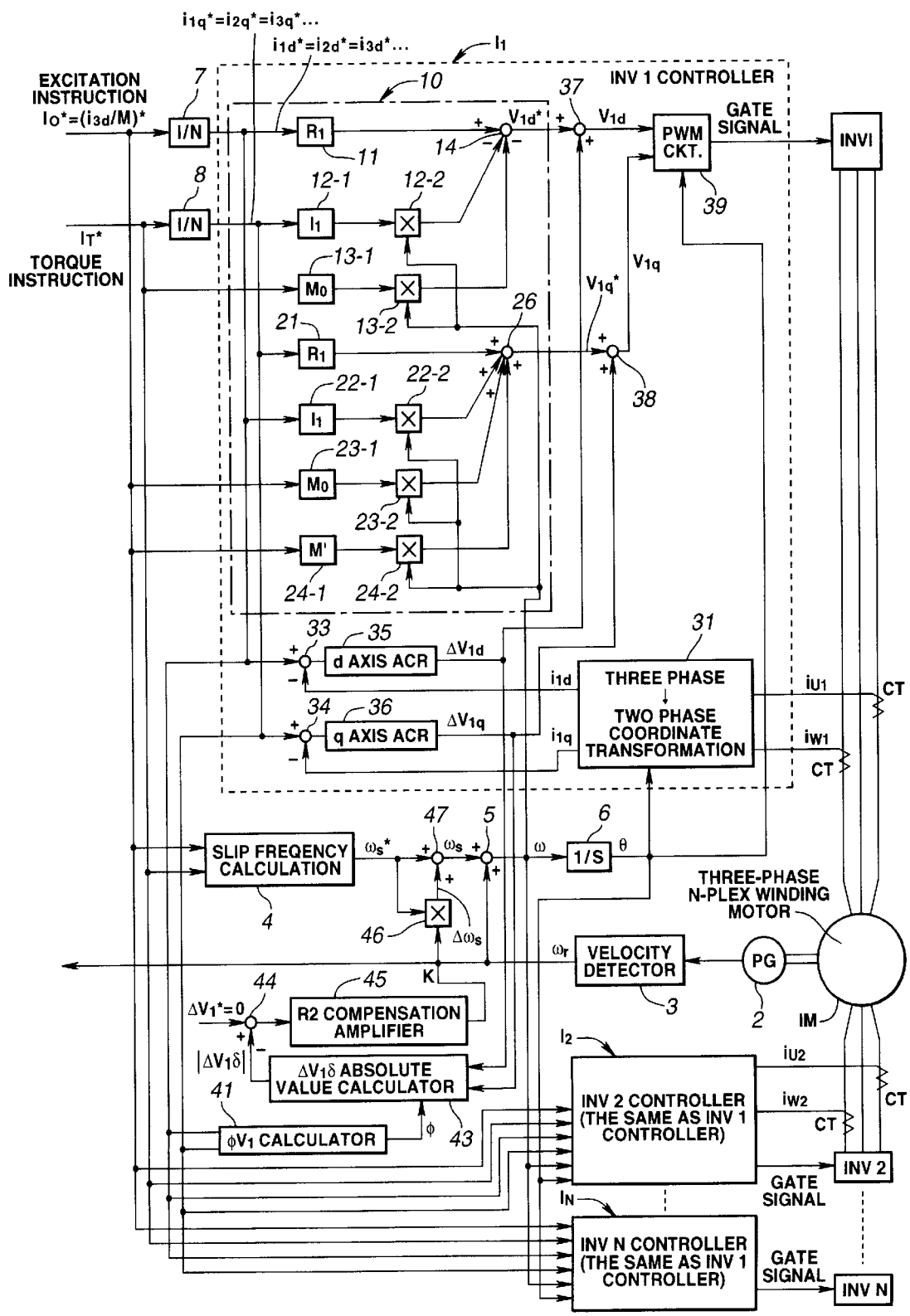
FIG. 19 is a circuit block diagram of the vector control apparatus for the three-phase N-plex winding motor in a twelfth preferred embodiment according to the present invention in which the secondary resistance variation compensation method is adopted.

FIG. 19 shows the system configuration of the vector control apparatus with the secondary resistance variation compensation for the three-phase N-plex winding motor in a twelfth preferred embodiment according to the present invention.

In the twelfth embodiment shown in FIG. 19, the secondary resistance variation compensation circuit (41 to 47) which controls the slip frequency ωs* so as to provide $\Delta V_1 \delta$ to be zeroed ($\Delta V_1 \delta=0$) is added to the vector control apparatus shown in FIG. 9.

As described above, the vector control apparatus for the three-phase N-plex (N=2, 3, 4, - - -) winding motor can have the following advantages: (1) the decoupling control can be achieved for the three-phase N-plex winding motor; (2) both of the secondary magnetic flux and the secondary current can be controlled in the decoupling control mode, thus the ideal vector control being achieved; (3) the current response during the abrupt change in the torque of the motor can be improved and the torque response can be improved; (4) the secondary resistance variation compensation for the multiplex winding motor becomes possible and the torque control accuracy can be improved.

It is noted that the field weakening control and the maximum efficiency control (applicable to a drive source of an electric vehicle) described above will not be explained in details since these control methods are not so directly related to the present invention.

The entire content of the Japanese Patent Application P10-62534 (filed on Mar. 13, 1998) is herein incorporated by reference.

Although the present invention has been described above by reference to certain embodiments of the present invention, the present invention is not limited to the embodiments described above. Modifications and variations of the embodiments described above will occur to those skilled in the air in the light of the above teachings.

TABLE 1

$$\begin{bmatrix} V_1d \\ V_1q \\ V_2d \\ V_2q \\ 0 \\ 0 \end{bmatrix} = \begin{bmatrix} R_1+L_1P & -\omega L_1 & M_{12}P & -\omega M_{12} & M_{13}P & -\omega M_{13} \\ \omega L_1 & R_1+L_1P & \omega M_{12} & M_{12}P & \omega M_{13} & M_{13}P \\ M_{12}P & -\omega M_{12} & R_2+L_2P & -\omega L_2 & M_{23}P & -\omega M_{23} \\ \omega M_{12} & M_{12}P & \omega L_2 & R_2+L_2P & \omega M_{23} & M_{23}P \\ M_{13}P & -s\omega M_{13} & M_{23}P & -s\omega M_{23} & R_3+L_3P & -s\omega L_3 \\ s\omega M_{13} & M_{13}P & s\omega M_{23} & M_{23}P & s\omega L_3 & R_3+L_3P \end{bmatrix} \begin{bmatrix} i_1d \\ i_1q \\ i_2d \\ i_2q \\ i_3d \\ i_3q \end{bmatrix} \quad (1)$$

$$T = \frac{\text{Pole}}{2}\{M_{13}(i_3 di_1q - i_3qi_1d) + M_{23}(i_3 di_2q - i_3qi_2d)\}$$
$$= \frac{\text{Pole}}{2} \cdot M\{(i_1q + i_2q)i_3d - (i_1d + i_2d)i_3q\} \quad [\text{N}\cdot\text{m}] \quad (2)$$

$$\left.\begin{array}{l} \lambda_3 d = M_{13}i_1d + M_{23}i_2d + L_3 i_3 d \\ \lambda_3 q = M_{13}i_1q + M_{23}i_2q + L_3 i_3 q \end{array}\right\} \quad (3)$$

$$\left.\begin{array}{l} i_3 d = \dfrac{1}{L_3}\lambda_3 d - \dfrac{M_{13}}{L_3}i_1d - \dfrac{M_{23}}{L_3}i_2d \\ i_3 q = \dfrac{1}{L_3}\lambda_3 q - \dfrac{M_{13}}{L_3}i_1q - \dfrac{M_{23}}{L_3}i_2q \end{array}\right\} \quad (4)$$

TABLE 2

$$\begin{bmatrix} i_1d \\ i_1q \\ i_2d \\ i_2q \\ i_3d \\ i_3q \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ -\dfrac{M_{13}}{L_3} & 0 & -\dfrac{M_{23}}{L_3} & 0 & \dfrac{1}{L_3} & 0 \\ 0 & -\dfrac{M_{13}}{L_3} & 0 & -\dfrac{M_{23}}{L_3} & 0 & \dfrac{1}{L_3} \end{bmatrix} \begin{bmatrix} i_1d \\ i_1q \\ i_2d \\ i_2q \\ \lambda_3 d \\ \lambda_3 q \end{bmatrix} \quad (5)$$

$$\begin{bmatrix} R_1+\left(L_1-\dfrac{M_{13}^2}{L_3}\right)P & -\omega\left(L_1-\dfrac{M_{13}^2}{L_3}\right) & \left(M_{12}-\dfrac{M_{13}M_{23}}{L_3}\right)P & -\omega\left(M_{12}-\dfrac{M_{13}M_{23}}{L_3}\right) & \dfrac{M_{13}}{L_3}P & -\omega\dfrac{M_{13}}{L_3} \\ \omega\left(L_1-\dfrac{M_{13}^2}{L_3}\right) & R_1+\left(L_1-\dfrac{M_{13}^2}{L_3}\right)P & \omega\left(M_{12}-\dfrac{M_{13}M_{23}}{L_3}\right) & \left(M_{12}-\dfrac{M_{13}M_{23}}{L_3}\right)P & \omega\dfrac{M_{13}}{L_3} & \dfrac{M_{13}}{L_3}P \\ \left(M_{12}-\dfrac{M_{23}M_{13}}{L_3}\right)P & -\omega\left(M_{12}-\dfrac{M_{13}M_{23}}{L_3}\right) & R_2+\left(L_2-\dfrac{M_{23}^2}{L_3}\right)P & -\omega\left(L_2-\dfrac{M_{23}^2}{L_3}\right) & \dfrac{M_{23}}{L_3}P & -\omega\dfrac{M_{23}}{L_3} \\ \omega\left(M_{12}-\dfrac{M_{13}M_{23}}{L_3}\right) & \left(M_{12}-\dfrac{M_{23}M_{13}}{L_3}\right)P & \omega\left(L_2-\dfrac{M_{23}^2}{L_3}\right) & R_2+\left(L_2-\dfrac{M_{23}^2}{L_3}\right)P & \omega\dfrac{M_{23}}{L_3} & \dfrac{M_{23}}{L_3}P \\ -R_3\dfrac{M_{13}}{L_3} & 0 & -R_3\dfrac{M_{23}}{L_3} & 0 & \dfrac{R_3}{L_3}+P & -\omega s \\ 0 & -R_3\dfrac{M_{13}}{L_3} & 0 & -R_3\dfrac{M_{23}}{L_3} & \omega s & \dfrac{R_3}{L_3}+P \end{bmatrix}$$

TABLE 3

$$\begin{bmatrix} V_1d \\ V_1q \\ V_2d \\ V_2q \\ 0 \\ 0 \end{bmatrix} = \begin{bmatrix} R_1+\left(L_1-\frac{M_{13}^2}{L_3}\right)P & -\omega\left(L_1-\frac{M_{13}^2}{L_3}\right) & \left(M_{12}-\frac{M_{13}M_{23}}{L_3}\right)P & -\omega\left(M_{12}-\frac{M_{13}M_{23}}{L_3}\right) & \frac{M_{13}}{L_3}P & -\omega\frac{M_{13}}{L_3} \\ \omega\left(L_1-\frac{M_{13}^2}{L_3}\right) & R_1+\left(L_1-\frac{M_{13}^2}{L_3}\right)P & \omega\left(M_{12}-\frac{M_{13}M_{23}}{L_3}\right) & \left(M_{12}-\frac{M_{13}M_{23}}{L_3}\right)P & \omega\frac{M_{13}}{L_3} & \frac{M_{13}}{L_3}P \\ \left(M_{12}-\frac{M_{23}M_{13}}{L_3}\right)P & -\omega\left(M_{12}-\frac{M_{13}M_{23}}{L_3}\right) & R_2+\left(L_2-\frac{M_{23}^2}{L_3}\right)P & -\omega\left(L_2-\frac{M_{23}^2}{L_3}\right) & \frac{M_{23}}{L_3}P & -\omega\frac{M_{23}}{L_3} \\ \omega\left(M_{12}-\frac{M_{13}M_{23}}{L_3}\right) & \left(M_{12}-\frac{M_{23}M_{13}}{L_3}\right)P & \omega\left(L_2-\frac{M_{23}^2}{L_3}\right) & R_2+\left(L_2-\frac{M_{23}^2}{L_3}\right)P & \omega\frac{M_{23}}{L_3} & \frac{M_{23}}{L_3}P \\ -R_3\frac{M_{13}}{L_3} & 0 & -R_3\frac{M_{23}}{L_3} & 0 & \frac{R_3}{L_3}+P & -\omega s \\ 0 & -R_3\frac{M_{13}}{L_3} & 0 & -R_3\frac{M_{23}}{L_3} & \omega s & \frac{R_3}{L_3}+P \end{bmatrix} \times \begin{bmatrix} i_1d \\ i_1q \\ i_2d \\ i_2q \\ \lambda_3d \\ \lambda_3q \end{bmatrix} \quad (6)$$

TABLE 4

$$\begin{bmatrix} V_1d \\ V_1q \\ V_2d \\ V_2q \\ 0 \\ 0 \end{bmatrix} = \begin{bmatrix} R_1+(l_1+M\sigma)P & -\omega(l_1+M\sigma) & M\sigma P & -\omega M\sigma & \frac{M}{L_3}P & -\omega\frac{M}{L_3} \\ \omega(l_1+M\sigma) & R_1+(l_1+M\sigma)P & \omega M\sigma & M\sigma P & \omega\frac{M}{L_3} & \frac{M}{L_3}P \\ M\sigma P & -\omega M\sigma & R_2+(l_2+M\sigma)P & -\omega(l_2+M\sigma) & \frac{M}{L_3}P & -\omega\frac{M}{L_3} \\ \omega M\sigma & M\sigma P & \omega(l_2+M\sigma) & R_2+(l_2+M\sigma)P & \omega\frac{M}{L_3} & \frac{M}{L_3}P \\ -R_3\frac{M}{L_3} & 0 & -R_3\frac{M}{L_3} & 0 & \frac{R_3}{L_3}+P & -\omega s \\ 0 & -R_3\frac{M}{L_3} & 0 & -R_3\frac{M}{L_3} & \omega s & \frac{R_3}{L_3}+P \end{bmatrix} \begin{bmatrix} i_1d \\ i_1q \\ i_2d \\ i_2q \\ i_3d \\ i_3q \end{bmatrix} \quad (7)$$

$$\begin{bmatrix} V_1d \\ V_1q \\ V_2d \\ V_2q \\ 0 \\ 0 \end{bmatrix} = \begin{bmatrix} R_1+(l_1+M\sigma)P & -\omega(l_1+M\sigma) & M\sigma P & -\omega M\sigma & M'P & -\omega M' \\ \omega(l_1+M\sigma) & R_1+(l_1+M\sigma)P & \omega M\sigma & M\sigma P & \omega M' & M'P \\ M\sigma P & -\omega M\sigma & R_2+(l_2+M\sigma)P & -\omega(l_2+M\sigma) & M'P & -\omega M' \\ \omega M\sigma & M\sigma P & \omega(l_2+M\sigma) & R_2+(l_2+M\sigma)P & \omega M' & M'P \\ -R_3' & 0 & -R_3' & 0 & R_3'+M'P & -\omega sM' \\ 0 & -R_3' & 0 & -R_3' & \omega sM' & R_3+M'P \end{bmatrix} \begin{bmatrix} i_1d \\ i_1q \\ i_2d \\ i_2q \\ \lambda_3d/M \\ \lambda_3q/M \end{bmatrix} \quad (8)$$

TABLE 5

$$0 = M(i_1q + i_2q) + L_3 i_3q$$

$$\therefore i_3q = -\frac{M}{L_3}(i_1q + i_2q) \quad (9)$$

$$i_1q + i_2q = -\frac{L_3}{M} i_3q \quad (10)$$

$$0 = -R_3' i_1q - R_3' i_2q + \omega s M' \cdot \lambda_3 d/M$$

$$\omega s = \frac{R_3'}{M'} \cdot \frac{(i_1q + i_2q)}{\lambda_3 d/M} \quad (11)$$

TABLE 6

$$0 = -R_3' i_1d - R_3' i_2d + (R_3' + M'P)\lambda_3 d/M$$

$$i_1d + i_2d = \left(1 + \frac{M'}{R_3'}P\right) \cdot \lambda_3 d/M \quad (12)$$

$$\begin{aligned} T &= \frac{\text{Pole}}{2} \cdot M\{(i_1q + i_2q)i_3d - (i_1d + i_2d)i_3q\} \\ &= \frac{\text{Pole}}{2} \cdot M\{-(i_1d + i_2d)i_3q\} \\ &= \frac{\text{Pole}}{2} \cdot M\{-(i_1d + i_2d)i_3q\} \end{aligned} \quad (12A)$$

$$\because i_3d = 0 \quad (12B)$$

TABLE 6-continued $$T = \frac{Pole}{2} \cdot M\left\{\frac{M}{L_3}(i_1d + i_2d)(i_1q + i_2q)\right\} \quad (13)$$
$$= \frac{Pole}{2} \cdot M'(i_1d + i_2d)(i_1q + i_2q)$$

TABLE 7

$$\left.\begin{aligned}V_1d &= R_1i_1d - \omega l_1 i_1 q - \omega M\sigma(i_1q + i_2q) \\ V_1q &= \omega l_1 i_1 d + R_1 i_1 q + \omega M\sigma(i_1d + i_2d) + \omega M' \cdot \lambda_3 d/M \\ V_2d &= R_2 i_2 d - \omega l_2 i_2 q - \omega M\sigma(i_1q + i_2q) \\ V_2q &= \omega l_2 i_2 d + R_2 i_2 q + \omega M\sigma(i_1d + i_2d) + \omega M' \cdot \lambda_3 d/M\end{aligned}\right\} \quad (14)$$

$$\left.\begin{aligned}V_1d &= R_1i_1d - \omega l_1 i_1 q - \omega M\sigma(i_1q + i_2q) \\ V_1q &= \omega l_1 i_1 d + R_1 i_1 q + \omega(M\sigma + M')(i_1d + i_2d) \\ &= \omega l_1 i_1 d + R_1 i_1 q + \omega M(i_1d + i_2d) \\ \\ V_2d &= R_2 i_2 d - \omega l_2 i_2 q - \omega M\sigma(i_1q + i_2q) \\ V_2q &= \omega l_2 i_2 d + R_2 i_2 q + \omega(M\sigma + M')(i_1d + i_2d) \\ &= \omega l_2 i_2 d + R_2 i_2 q + \omega M(i_1d + i_2d)\end{aligned}\right\} \quad (14)'$$

TABLE 8

$$V_1d = R_1 i_1 d - \omega L\sigma i_1 q$$

$$\begin{aligned}V_1q &= \omega M' i_1 d + \omega L\sigma i_1 + R_1 i_1 q \\ &= \omega L_1 i_1 d + R_1 i_1 q\end{aligned} \quad (15)$$

$$\begin{aligned}\omega s &= \omega s* + \Delta\omega s = \omega s* + K\omega s* \\ &= (1+K)\omega s* \\ &= (1+K)\cdot\frac{R_3'*}{M'*}\cdot\frac{l_T*}{lo*}\end{aligned} \quad (16)$$

$$|\Delta V_1| = \sqrt{(\Delta V_1d)^2 + (\Delta V_1q)^2} \quad (17)$$

$$\phi = \tan^{-1}\frac{i_1q}{i_1d} = \tan^{-1}\frac{l_T*}{lo*} \quad (18)$$

TABLE 9

$$\begin{aligned}\begin{bmatrix}\Delta V_1\gamma \\ \Delta V_1\delta\end{bmatrix} &= \begin{bmatrix}\cos\phi & \cos(90°-\phi) \\ -\sin\phi & \sin(90°-\phi)\end{bmatrix}\begin{bmatrix}\Delta V_1d \\ \Delta V_1q\end{bmatrix} \\ &= \begin{bmatrix}\cos\phi & \sin\phi \\ -\sin\phi & \cos\phi\end{bmatrix}\begin{bmatrix}\Delta V_1d \\ \Delta V_1q\end{bmatrix}\end{aligned} \quad (19)$$

$$\therefore \Delta V_1\delta = -\Delta V_1d \sin\phi + \Delta V_1q \cos\phi \quad (19)'$$

What is claimed is:

1. A control apparatus for a three-phase multiplex winding motor, comprising:
a plurality of inverters, each inverter operatively driving a corresponding winding couple of multiplex windings of the motor;
a plurality of controllers whose number corresponds to that of the inverters, each controller controlling an operation of a corresponding one of the inverters, each controller including: a decoupling voltage calculator for calculating d-axis and q-axis voltage setting values $V_1d*$ and $V_1q*$ on the basis of an excitation instruction value Io*, a torque instruction value $I_T*$, d-axis-and-q-axis current instruction values $i_1d*$ and $i_1q*$ which are quotients of the excitation instruction value Io* and the torque instruction value $I_T*$ divided respectively by the multiplex number N of the winding couples of the motor, and a power supply frequency ω which is an addition of a slip frequency ωs to a rotor revolution frequency ωr; a d-axis-and-q-axis current controller for performing proportional-and-integration calculations for respective deviations between d-axis current instruction value $i_1d*$ and its detected value iid and between q-axis current instruction value $i_1q*$ and its detected value $i_1q$ so as to derive d-axis and q-axis voltage errors $\Delta V_1d$ and $\Delta V_1q$; and a plurality of PWM circuits, each PWM circuit receiving d-axis and q-axis voltages $V_1d$ and $V_1q$ as d-axis and d-axis voltage instructions and generating and outputting gate signals to the corresponding one of the inverters according to the d-axis and g-axis voltage instructions so as to control the operation of the corresponding one of the inverters, the d-axis and d-axis voltages being respective additions of the d-axis and q-axis voltage setting values $V_1d*$ and $V_1q*$ received from the decoupling voltage calculator to d-axis-and-q-axis voltage errors $\Delta V_1d$ and $\Delta V_1q$ outputted from the d-axis-and-q-axis current controller.

2. A control apparatus for a three-phase multiplex winding motor as claimed in claim 1, wherein the decoupling current controller of each controller calculates as follows: $V_1d*=i_1d*\times R_1-i_1q*\times l_1\times\omega-I_T*\times M\sigma\times\omega$ and $V_1q*=i_1q*\times R_1+i_1d*\times l_1\times\omega+Io*\times M\sigma\times\omega+Io*\times M'\times\omega$, wherein $l_1=L_1-M$, $M\sigma\times M-M^2/L_3$, $M'=M^2/L_3$, $R_1$ denotes a resistance corresponding to one phase in a first winding of the multiplex windings, $L_1$ denotes a self inductance corresponding one phase in the first winding, M denotes a mutual inductance between each winding of the multiplex windings, and $L_3$ denotes a self inductance corresponding one phase of a rotor of the multiplex winding motor.

3. A control apparatus for a three-phase multiplex winding motor as claimed in claim 2, wherein the multiplex number N of the multiplex windings is 2 and wherein the number of the inverters is 2, a first inverter driving the first winding of the motor and a second inverter driving a second winding of the motor.

4. A control apparatus for a three-phase multiplex winding motor as claimed in claim 1, wherein the decoupling voltage calculator calculates as follows:

$$V_1d*=i_1d*\times R_1-i_1q\times l_1\times\omega-I_T*\times M\sigma\times\omega \text{ and}$$

$$V_1q*=i_1q*\times R_1+i_1d*\times l_1\times\omega+Io*\times M\times\omega,$$

wherein $l_{1=l1}-M$, $M\sigma=M-M^2/L_3$, $R_1$ denotes a resistance corresponding to one phase of a first winding of the multiplex windings of the multiplex winding motor, $L_1$ denotes a self inductance corresponding to one phase of the first winding, M denotes a mutual inductance between each winding, $L_3$ denotes a self inductance of a rotor of the multiplex winding motor.

5. A control apparatus for a three-phase multiplex winding motor as claimed in claim 4, wherein the multiplex number N of the multiplex windings is 2 and wherein the number of the inverters is 2, a first inverter driving the first winding of the motor and a second inverter driving a second winding of the motor.

6. A control apparatus for a three-phase multiplex winding motor as claimed in claim 2, wherein each controller further comprises a secondary resistance variation compensation circuit including: a subtractor for deriving a deviation between a d-axis voltage variation preset value ($\Delta V_1 d^*=0$) and the d-axis voltage error $\Delta V_1 d$ derived from the d-axis-and-q-axis current controller; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance varaition rate) of the secondary resistance variation compensation ampllifier; and an adder for adding the slip frequency $\omega s$ to the output of the multiplier to provide $\omega s^*(1+K)$.

7. A control apparatus for a three-phase multiplex winding motor as claimed in claim 6, wherein $\omega s = \omega s^* + \Delta \omega s = \omega s^* + K\omega s^* = (1+K)\omega s^* = (1+K)\cdot R_3'^*/M'^* \cdot I_T^*/Io^*$, wherein $R_3' = (M/L_3)\cdot R_3$, $M' = M^2/L_3$, $R_3$ denotes a resistance corresponding to one phase of a rotor winding of the three-phase multiplex winding motor, $R_3'^*$ denotes a set value of $R_3'$ and $M'^*$ denotes a set value of M.

8. A control apparatus for a three-phase multiplex winding motor as claimed in claim 2, wherein each controller further comprises a secondary resistance variation compensation circuit including: a subtractor for deriving a deviation between a q-axis voltage variation preset value ($\Delta V_1 q^*=0$) and the q-axis voltage error $\Delta V_1 q$ derived from the d-axis-and-q-axis current controller; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance varaition rate) of the secondary resistance variation compensation ampllifier; and an adder for adding the slip frequency $\omega s$ to the output of the multiplier to provide $\omega s(1+K)$.

9. A control apparatus for a three-phase multiplex winding motor as claimed in claim 2, wherein each controller further comprises a secondary resistance variation compensation circuit including: a voltage variation absolute value calculator for calculating an absolute value of a voltage variation $|\Delta V_1|$ between the d-axis voltage error $\Delta V_1 d$ and the q-axis voltage error $\Delta V_1 q$ derived from the d-axis-and-q-axis current controller; a subtractor for deriving a deviation between a voltage variation preset value $V_1^*$ ($V_1^* 0$) and the absolute value of the voltage variation $|\Delta V_1|$; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance variation rate) of the secondary resistance variation compensation amplifier; and an adder for adding the slip frequency $\omega s$ to the output of the multiplier to provide $\omega s^*(1+K)$.

10. A control apparatus for a three-phase multiplex winding motor as claimed in claim 9, wherein $|\Delta V_1| = \sqrt{\{(\Delta V_1 d)^2 + \Delta V_1 q\}^2\}}$.

11. A control apparatus for a three-phase multiplex winding motor as claimed in claim 2, wherein each controller further comprises a secondary resistance variation compensation circuit including: a phase angle calculator for calculating a phase angle $\phi$ between the d-q axis and a $\gamma$–$\delta$ axis on the basis of the excitation current instruction value $i_1 d^*$ and the torque current instruction value $i_1 q^*$, the excitation current instruction value $i_1 d^*$ and the torque current instruction value being respectively derived from the excitation instruction value Io* and the torque instruction value $I_T^*$; a voltage variation calculator for calculating a $\delta$-axis voltage variation $\Delta V_1 \delta$ according to the d-axis voltage error $\Delta V_1 d$ and the q-axis voltage error $\Delta V_1 q$ derived from the d-axis-and-q-axis current controller and the derived phase angle $\phi$; a subtractor for deriving a deviation between a $\delta$-axis voltage variation preset value $\Delta V_1 \delta^*(V_1 \delta^*=0)$ and the $\delta$-axis voltage variation $\Delta V_1 \delta$; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance variation rate) of the secondary resistance variation compensation amplifier; and an adder for adding the slip frequency $\omega s$ to the output of the multiplier to provide $\omega s^*(1+K)$.

12. A control apparatus for a three-phase multiplex winding motor as claimed in claim 11, wherein the phase angle $\phi$ calculator calculates the phase angle $\phi$ between the d-q axis and the $\gamma$-$\delta$ axis as follows:

$$\phi = \tan^{-1} i_1 q / i_1 d = \tan^{-1} I_T^*/Io^*.$$

13. A control apparatus for a three-phase multiplex winding motor as claimed in claim 12, wherein $\Delta V_1 \delta = \Delta V_1 d \sin \phi + \Delta V_q q \cos \phi$.

14. A control apparatus for a three-phase multiplex winding motor as claimed in claim 3, which further comprises: current transformers for detecting two phase currents $iu_1$ and $iw_1$ flowing from the corresponding one of the inverters to the three-phase multiplex winding motor; and a velocity detector for detecting the revolution speed $\omega r$ of the rotor of the motor and wherein each controller includes: a rotation phase determinator for determining a rotation phase $\theta$ of the rotor of the motor according to the power supply frequency $\omega$; and a three-phase-to-two-phase coordinate transformer for transforming the two phase currents $iu_1$ and $iw_1$ from the current transformers into the d-axis detected value $i_1 d$ and q-axis detected value $i_q$ receiving the rotation phase $\theta$.

15. A control apparatus for a three-phase multiplex winding motor as claimed in claim 14, whicch further comprises a first-order phase advance compensation filter having a characteristic represented by $(1+M'/R_3'\cdot P)$, wherein $R_3'=(M/L_3)=R_3$, $M'=M^2/L_3$, $R_3$ denotes a resistance corresponding to one phase of a rotor winding of the three-phase winding motor, and P is a differential operator (d/dt), and outputting the excitation instruction value Io* from an inputted excitation instruction value $(\lambda 3d/M)^*$, wherein $\lambda 3d = M_{13}(=M) i_1 d + M_{23}(=M) i_2 d + L_3 i_3 d$ $\lambda 3d/M \approx i_1 d + i_2 d$, wherein $i_1 d$ denotes a d-axis current in the first winding and $i_2 d$ denotes a d-axis current in the second winding.

16. A control apparatus for a three-phase multiplex winding motor as claimed in claim 4, wherein each controller further comprises a secondary resistance variation compensation circuit including: a subtractor for deriving a deviation between a d-axis voltage variation preset value ($\Delta V_1 d^*=0$) and the d-axis voltage error $\Delta V_1 d$ derived from the d-axis-and-q-axis current controller; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance varaition rate) of the secondary resistance variation compensation ampllifier; and an adder for adding the slip frequency $\omega s$ to the output of the multiplier to provide $\omega s^*(1+K)$.

17. A control apparatus for a three-phase multiplex winding motor as claimed in claim 4, wherein each controller further comprises a secondary resistance variation compensation circuit including: a subtractor for deriving a deviation between a q-axis voltage variation preset value ($\Delta V_1 q^* = 0$) and the q-axis voltage error $\Delta V_1 q$ derived from the d-axis-and-q-axis current controller; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance varaition rate) of the secondary resistance variation compensation ampllifier; and an adder for adding the slip frequency $\omega s$ to the output of the multiplier to provide $\omega s^*(1+K)$.

18. A control apparatus for a three-phase multiplex winding motor as claimed in claim 4, wherein each controller further comprises a secondary resistance variation compensation circuit including: a voltage variation absolute value calculator for calculating an absolute value of a voltage variation $|\Delta V_1|$ between the d-axis voltage error $\Delta V_1 d$ and the q-axis voltage error $\Delta V_1 q$ derived from the d-axis-and-q-axis current controller; a subtractor for deriving a deviation between a voltage variation preset value $V_1^*$ ($V_1^* = 0$) and the absolute value of the voltage variation $|\Delta V_1|$; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance variation rate) of the secondary resistance variation compensation amplifier; and an adder for adding the slip frequency $\omega s$ to the output of the multiplier to provide $\omega s^*(1+K)$.

19. A control apparatus for a three-phase multiplex winding motor as claimed in claim 4, wherein each controller further comprises a secondary resistance variation compensation circuit including: a phase angle calculator for calculating a phase angle $\phi$ between the d-q axis and a $\gamma$-$\delta$ axis on the basis of the excitation current instruction value $ii d^*$ and the torque current instruction value $i_1 q^*$, the excitation current instruction value $i_1 d^*$ and the torque current instruction value being respectively derived from the excitation instruction value Io* and the torque instruction value $I_T^*$; a voltage variation calculator for calculating a $\delta$-axis voltage variation $\Delta V_1 \delta$ according to the d-axis voltage error $\Delta V_1 d$ and the q-axis voltage error $\Delta V_1 q$ derived from the d-axis-and-q-axis current controller and the derived phase angle $\phi$; a subtractor for deriving a deviation between a $\delta$-axis voltage variation preset value $V_1 \delta^* (V_1 \delta^* = 0)$ and the $\delta$-axis voltage variation $\Delta V_1 \delta$; a secondary resistance variation compensation amplifier for performing a proportional-and-integration calculation for the deviation derived from the subtractor; a slip frequency calculator for calculating the slip frequency $\omega s^*$ on the basis of the excitation instruction value Io* and the torque instruction value $I_T^*$; a multiplier for multiplying the slip frequency $\omega s^*$ by an output K (K denotes a secondary resistance variation rate) of the secondary resistance variation compensation amplifier; and an adder for adding the slip frequency $\omega s$ to the output of the multiplier to provide $\omega s^*(1+K)$.

20. A control method for a three-phase multiplex winding motor, comprising:

providing a plurality of inverters, each inverter operatively driving a corresponding winding couple of multiplex windings of the motor;

calculating d-axis and q-axis voltage setting values $V_1 d^*$ and $V_1 q^*$ on the basis of an excitation instruction value Io*, a torque instruction value $I_T^*$, d-axis-and-q-axis current instruction values $i_1 d^*$ and $i_1 q^*$ which are quotients of the excitation instruction value Io* and the torque instruction value $I_T^*$ divided respectively by a multiplex number N of the winding couples of the motor, and a power supply frequency $\omega$ which is an addition of a slip frequency $\omega s$ to a rotor revolution frequency $\omega r$;

calculating a proportional-and-integration for respective deviations between d-axis current instruction value $i_1 d^*$ and its detected value $i_1 d$ and between q-axis current instruction value $i_1 q^*$ and its detected value $i_1 q$ so as to derive d-axis and q-axis voltage errors $\Delta V_1 d$ and $\Delta V_1 q$;

receiving d-axis and q-axis voltages $V_1 d$ and $V_1 q$ as d-axis and d-axis voltage instructions; and outputting gate signals to the corresponding one of the inverters so as to control the operation of the corresponding one of the inverters, the d-axis and d-axis voltages being respective additions of the d-axis and q-axis voltage setting values $V_1 d^*$ and $V_1 q^*$ to d-axis-and-q-axis voltage errors $\Delta V_1 d$ and $\Delta V_1 q$.

* * * * *